(12) United States Patent
Kim

(10) Patent No.: US 11,055,019 B2
(45) Date of Patent: Jul. 6, 2021

(54) STORAGE DEVICE AND METHOD OF OPERATING THE SAME

(71) Applicant: SK hynix Inc., Gyeonggi-do (KR)

(72) Inventor: Sang Sik Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/541,804

(22) Filed: Aug. 15, 2019

(65) Prior Publication Data

US 2020/0183614 A1 Jun. 11, 2020

(30) Foreign Application Priority Data

Dec. 11, 2018 (KR) .................. 10-2018-0159490

(51) Int. Cl.
| | |
|---|---|
| *G06F 12/00* | (2006.01) |
| *G06F 3/06* | (2006.01) |
| *G06F 12/0882* | (2016.01) |
| *G06F 12/02* | (2006.01) |

(52) U.S. Cl.
CPC .......... *G06F 3/0658* (2013.01); *G06F 3/0656* (2013.01); *G06F 3/0679* (2013.01); *G06F 12/0246* (2013.01); *G06F 12/0882* (2013.01); *G06F 3/0607* (2013.01)

(58) Field of Classification Search
CPC .... G06F 3/0659; G06F 3/0614; G06F 3/0658; G06F 3/0683; G06F 11/3058; G06F 3/0656; G06F 3/0679; G06F 3/0607; G06F 12/0246; G06F 12/0882; G06F 12/0607; G06F 2212/1032; G06F 12/14; G11C 11/5621; G11C 11/5642; G11C 11/56

See application file for complete search history.

(56) References Cited

U.S. PATENT DOCUMENTS

| | | | | |
|---|---|---|---|---|
| 5,528,535 | A * | 6/1996 | Honjo ..................... | G11C 11/22 365/145 |
| 2009/0225597 | A1 * | 9/2009 | Shin ....................... | G11C 16/10 365/185.05 |
| 2010/0002504 | A1 * | 1/2010 | Kim ....................... | G11C 7/1006 365/185.03 |
| 2010/0025811 | A1 * | 2/2010 | Bronner ................ | H01L 27/105 257/528 |
| 2010/0293393 | A1 * | 11/2010 | Park ..................... | G06F 12/0246 713/193 |
| 2012/0320699 | A1 * | 12/2012 | Noguchi .................. | G11C 8/08 365/226 |

(Continued)

FOREIGN PATENT DOCUMENTS

| | | |
|---|---|---|
| KR | 10-2010-0010664 | 2/2010 |
| KR | 10-2013-0080203 | 7/2013 |

*Primary Examiner* — Shawn X Gu
(74) *Attorney, Agent, or Firm* — IP & T Group LLP

(57) ABSTRACT

A memory controller configured to control a memory device including memory cells includes an input/output buffer configured to store input data provided from a host; a data converter configured to generate program data obtained by converting the input data such that the number of specific data patterns among data patterns to be stored in the memory cells is changed; and an operation controller configured to provide the program data to the memory device. The program data is generated by selectively inverting a plurality of pieces of logical page data included in the input data.

12 Claims, 17 Drawing Sheets

(56) References Cited

U.S. PATENT DOCUMENTS

| | | | |
|---|---|---|---|
| 2014/0063948 A1* | 3/2014 | Lim | G11C 16/06 365/185.11 |
| 2014/0164682 A1* | 6/2014 | Lee | G06F 12/0246 711/103 |
| 2014/0164683 A1* | 6/2014 | Shin | G11C 11/5621 711/103 |
| 2014/0173183 A1* | 6/2014 | Shin | G06F 12/0246 711/103 |
| 2014/0173184 A1* | 6/2014 | Kim | G11C 16/10 711/103 |
| 2014/0337574 A1* | 11/2014 | Cho | G06F 12/0246 711/114 |
| 2015/0052290 A1* | 2/2015 | Um | G06F 11/1441 711/103 |

\* cited by examiner

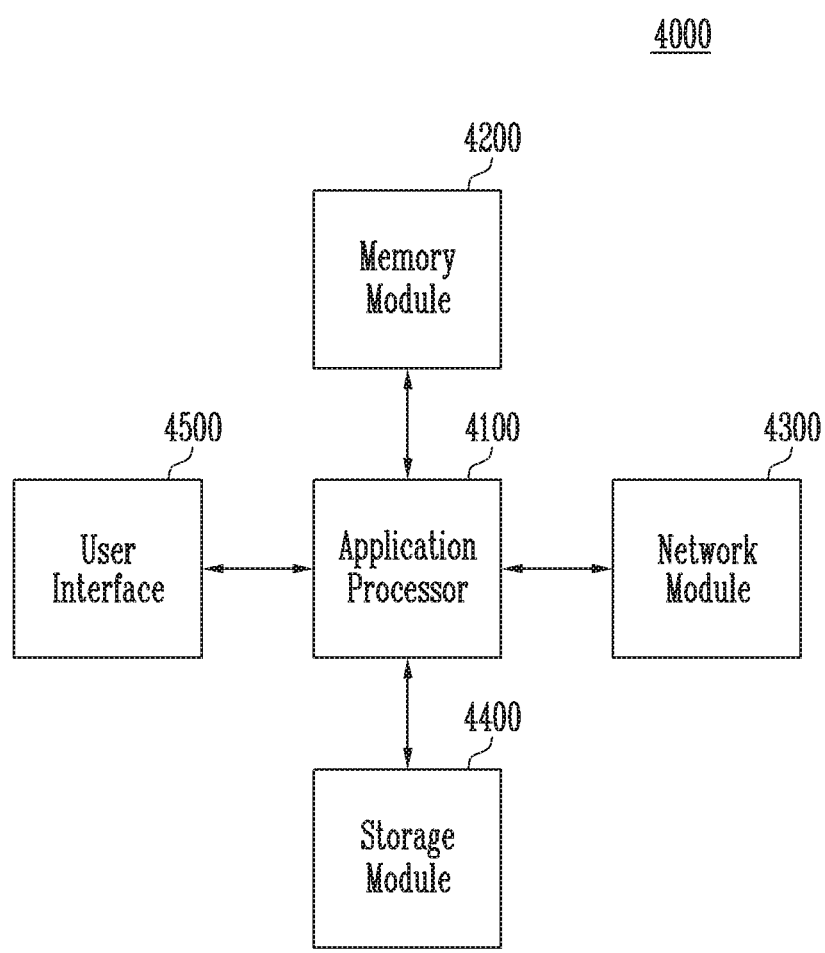

STORAGE DEVICE AND METHOD OF OPERATING THE SAME

CROSS-REFERENCE TO RELATED APPLICATION

The present application claims priority under 35 U.S.C. § 119(a) to Korean patent application number 10-2018-0159490, filed on Dec. 11, 2018, the entire disclosure of which is incorporated herein by reference in its entirety.

BACKGROUND

Field of Invention

Various embodiments of the present disclosure generally relate to an electronic device, and more particularly, to a storage device and a method of operating the storage device.

Description of Related Art

Generally, a storage device stores data under control of a host device such as a computer or a smartphone. The storage device may include a memory device configured to store data, and a memory controller configured to control the memory device. Memory devices are chiefly classified into volatile memory devices and nonvolatile memory devices.

A volatile memory device stores data only when power is supplied thereto. The data stored therein is lost when power is turned off. Examples of a volatile memory device include a static random access memory (SRAM), and a dynamic random access memory (DRAM).

In a nonvolatile memory device data stored therein is maintained even when power is turned off. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the present disclosure are directed to a storage device having improved reliability, and a method of operating the storage device.

An embodiment of the present disclosure may provide for a memory controller configured to control a memory device including memory cells, the memory controller including: an input/output buffer configured to store input data provided from a host; a data converter configured to generate program data obtained by converting the input data such that a number of specific data patterns among data patterns to be stored in the memory cells is changed; and an operation controller configured to provide the program data to the memory device, wherein the program data is generated by selectively inverting a plurality of pieces of logical page data included in the input data.

An embodiment of the present disclosure may provide for a memory controller configured to control a memory device including memory cells, the memory controller including: an operation controller configured to receive, from the memory device, read data obtained by reading data stored in the memory cells, the read data including a plurality of pieces of logical page data and inversion information corresponding to the plurality of pieces of logical page data; a data converter configured to generate output data that is data obtained by selectively inverting the plurality of pieces of logical page data based on the inversion information; and an input/output buffer configured to provide the output data to a host.

An embodiment of the present disclosure may provide for a method of operating a memory controller configured to control a memory device including memory cells, the method including: generating program data obtained by converting input data provided from a host such that a number of specific data patterns among data patterns to be stored in the memory cells is changed; and providing, to the memory device, a program command for storing the program data in the memory device, wherein the program data is generated by selectively inverting a plurality of pieces of logical page data included in the input data.

An embodiment of the present disclosure may provide for a storage device including: a memory device including memory cells; and a memory controller configured to receive input data from a host, generate program data obtained by converting the input data such that a number of specific data patterns among data patterns to be stored in the memory cells is changed, and store the program data in the memory cells, wherein the program data is generated by selectively inverting a plurality of pieces of logical page data included in the input data, and includes inversion information corresponding to the plurality of pieces of logical page data.

An embodiment of the present disclosure may provide for a storage device including: a memory device including a physical page corresponding to multi-level logical pages and a controller configured to: generate inversion data by selectively inverting, in a descending or ascending order, multi-level pieces of original data respectively corresponding to the multi-level logical pages, generate inversion information representing an inverted piece of data and control the memory device to store the inverted piece of data and the inversion information into the physical page, wherein the controller inverts a current-level piece of data among the multi-level pieces of data if a number of occurrences of a pattern in the original data either increases or decreases when the inverted current-level and previous-level pieces of data are combined, compared with when the non-inverted current-level and previous-level pieces of data are combined.

An embodiment of the present disclosure may provide for a storage device including: a memory device including a physical page corresponding to multi-level logical pages and configured to store inversion data and inversion information and a controller configured to restore original data by selectively inverting multi-level pieces of the inversion data according to the inversion information, wherein the inversion data is stored as multi-level pieces of the original data respectively corresponding to the multi-level logical pages selectively inverted in a descending or ascending order, wherein a current-level piece among the multi-level pieces of the inversion data is stored as inverted if a number of a set pattern of the original data to be stored in each cell within the physical page either increases or decreases when inverted current-level and previous-level pieces of the original data are combined, compared with when non-inverted current-level and previous-level pieces of the original data are combined.

BRIEF DESCRIPTION OF THE DRAWINGS

FIG. 20 is a block diagram illustrating a user system employing the storage device in accordance with an embodiment of the present disclosure.

DETAILED DESCRIPTION

Figure 1:
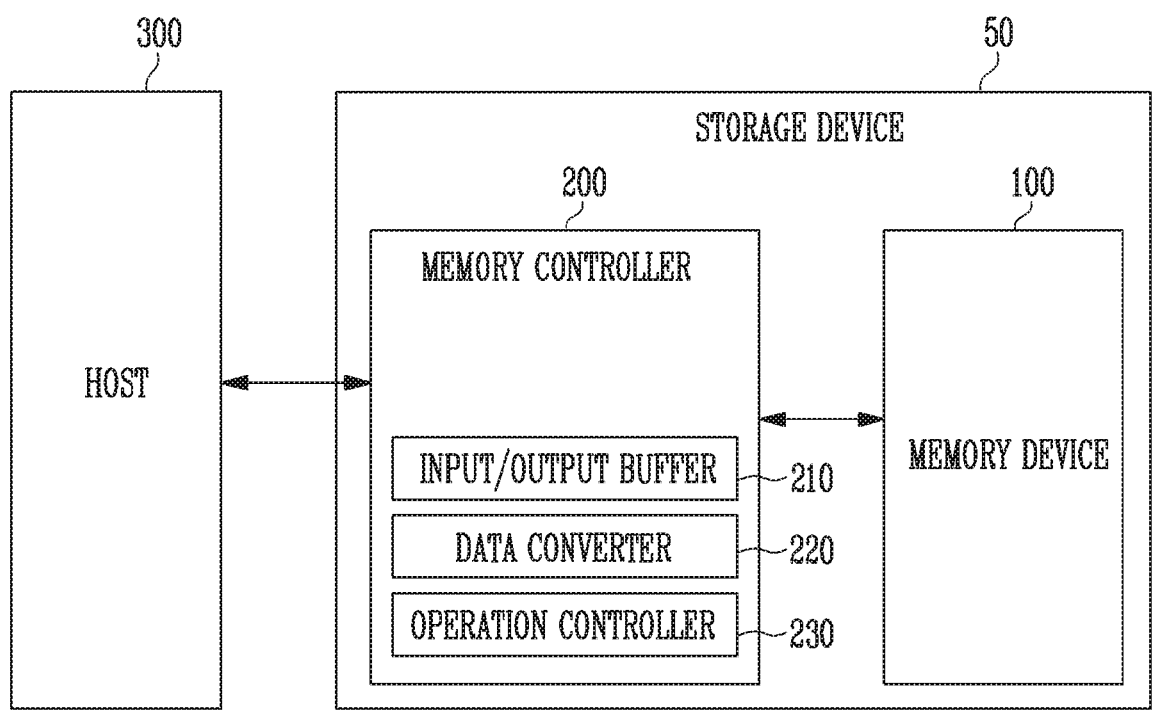
FIG. 1 is a diagram illustrating a storage device in accordance with an embodiment of the present disclosure.

Specific structural and functional description presented herein is directed to embodiments of the present disclosure. The present invention, however, is not limited to either the specific description provided or any of the embodiments described herein.

While various embodiments are described in detail, the present invention is not limited to any particular embodiment(s). Rather, the present invention encompasses all alternatives, modifications, equivalents and other embodiments that fall within the spirit and scope of the present disclosure.

It will be understood that, although the terms "first", "second", etc. may be used herein to identify various elements, these elements should not be limited by these terms. These terms are only used to distinguish one element from another element that otherwise have the same or similar names. For example, a first element in one instance could be termed a second element in another instance without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms and vice versa, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art is omitted to avoid obscuring the subject matter of the present disclosure. This aims to make the subject matter of the present disclosure clear.

Various embodiments of the present disclosure are described in detail below with reference to the attached drawings to enable those skilled in the art to practice the present invention. Throughout the specification, reference to "an embodiment," "another embodiment" or the like is not necessarily to only one embodiment, and different references to any such phrase are not necessarily to the same embodiment(s).

FIG. 1 is a diagram illustrating a storage device 50 in accordance with an embodiment of the present disclosure.

Referring to FIG. 1, the storage device 50 may include a memory device 100 and a memory controller 200 configured to control the operation of the memory device 100. The storage device 50 may be configured to store data under control of a host 300, such as a cellular phone, a smartphone, an MP3 player, a laptop computer, a desktop computer, a game machine, a TV, a tablet PC, or an in-vehicle infotainment system.

The storage device 50 may be configured as any of various kinds of storage devices depending on a host interface, which is a communication system with the host 300. For example, the storage device 50 may be configured as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) type storage device, a compact flash (CF) card, a smart media card, and/or a memory stick.

The storage device 50 may be manufactured as any of various package types. For instance, the storage device 50 may be manufactured as a package on package (POP) type, a system in package (SIP) type, a system on chip (SOC) type, a multi-chip package (MCP) type, a chip on board (COB) type, a wafer-level fabricated package (WFP) type, and/or a wafer-level stack package (WSP) type.

The memory device 100 may store data therein. The memory device 100 may operate under control of the memory controller 200. The memory device 100 may include a memory cell array including a plurality of memory cells configured to store data therein.

The memory cells may include a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks.

Each memory block may include a plurality of memory cells. Each memory block may include a plurality of pages. In an embodiment, a page may be the unit of storing data in the memory device 100 or reading stored data from the memory device 100. A memory block may be the unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, by way of example, features and aspects of the present invention are described in the context in which the memory device 100 is a NAND flash memory.

The memory device 100 may receive a command and an address from the memory controller 200 and access an area of the memory cell array that is selected by the address. In other words, the memory device 100 may perform an operation corresponding to the command on the area selected by the address. For example, the memory device 100 may perform a write (program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells to which data is to be stored, the memory cells being included in the memory device 100.

The memory controller 200 may control the memory device 100 to perform a program operation, a read operation, or an erase operation in response to a request from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a program command, an address and data regardless of a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control at least two or more memory devices 100. In this case, the memory controller 200 may control the memory devices 100 in an interleaving manner so as to enhance the operating performance. The interleaving scheme may be an operating scheme in which operating periods of two or more memory devices 100 overlap.

In an embodiment, the memory controller 200 may include an input/output buffer 210, a data converter 220, and an operation controller 230.

The input/output buffer 210 may store data which is input in response to a write request of the host 300. The input/output buffer 210 may provide the stored data to the data converter 220. The input/output buffer 210 may store data to be output to the host 300 in response to a read request of the host 300. The input/output buffer 210 may receive such data from the data converter 220.

The data converter 220 may convert data provided from the input/output buffer 210 and generate program data to be stored in the memory device 100. The data converter 220 may generate the program data by converting the inputted data such that a number of specific data patterns among data patterns to be stored in the memory device 100 is increased. In an embodiment, the data converter 220 may generate the program data by converting the input data such that the number of specific data patterns among data patterns to be stored in the memory device 100 is reduced. Increasing or reducing the number of a specific data pattern means to adjust the number of data values with the specific data pattern among data values with a plurality of data patterns. The plurality of data patterns are determined based on the number of data bits which a memory cell stores. For instance, a single level cell (SLC) may have two data patterns (0, 1). A multi-level cell (MLC) may have four data patterns (00, 01, 10, 11). Each data pattern may correspond to respectively one of an erase state and a plurality of program states that the memory cell has with reference to FIG. 7.

Each of the specific data patterns may be a preset data pattern. Specifically, the number of data values with the specific data patterns may be adjusted to improve program disturbance, memory cell retention, randomization, and so on. In other words, the specific data patterns may be determined variously depending on a purpose of a data conversion. For instance, a data pattern corresponding to the highest program state or the lowest program state may be set as a specific data pattern to decrease the program disturbance. A data pattern corresponding to the largest number of data values or the smallest number of data values may be set as the specific data pattern to distribute data evenly in the randomization.

The data converter 220 may generate converted data obtained by selectively inverting a plurality of pieces of logical page data included in the input data such that the number of specific data patterns is increased or reduced. The data converter 220 may generate inversion information indicating whether each of a plurality of pieces of logical page data has been inverted. The data converter 220 may generate program data including the converted data and the inversion information, and provide the generated program data to the operation controller 230.

The data converter 220 may receive, from the operation controller 230, read data obtained by reading data stored in memory cells. Here, the read data may include a plurality of pieces of logical page data and inversion information corresponding to each of the plurality of pieces of logical page data. The inversion information may be information indicating whether the corresponding logical page data has been inverted.

The data converter 220 may generate output data by converting the read data using the inversion information included in the read data. In an embodiment, the data converter 220 may generate the output data by selectively inverting the plurality of pieces of logical page data included in the read data based on the inversion information. The data converter 220 may provide the generated output data to the input/output buffer 210.

The operation controller 230 may store, in the memory device 100, program data provided from the data converter 220. The operation controller 230 may provide read data obtained by reading data stored in the memory device 100 to the data converter 220.

The host 300 may communicate with the storage device 50 using at least one of various communication methods, such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
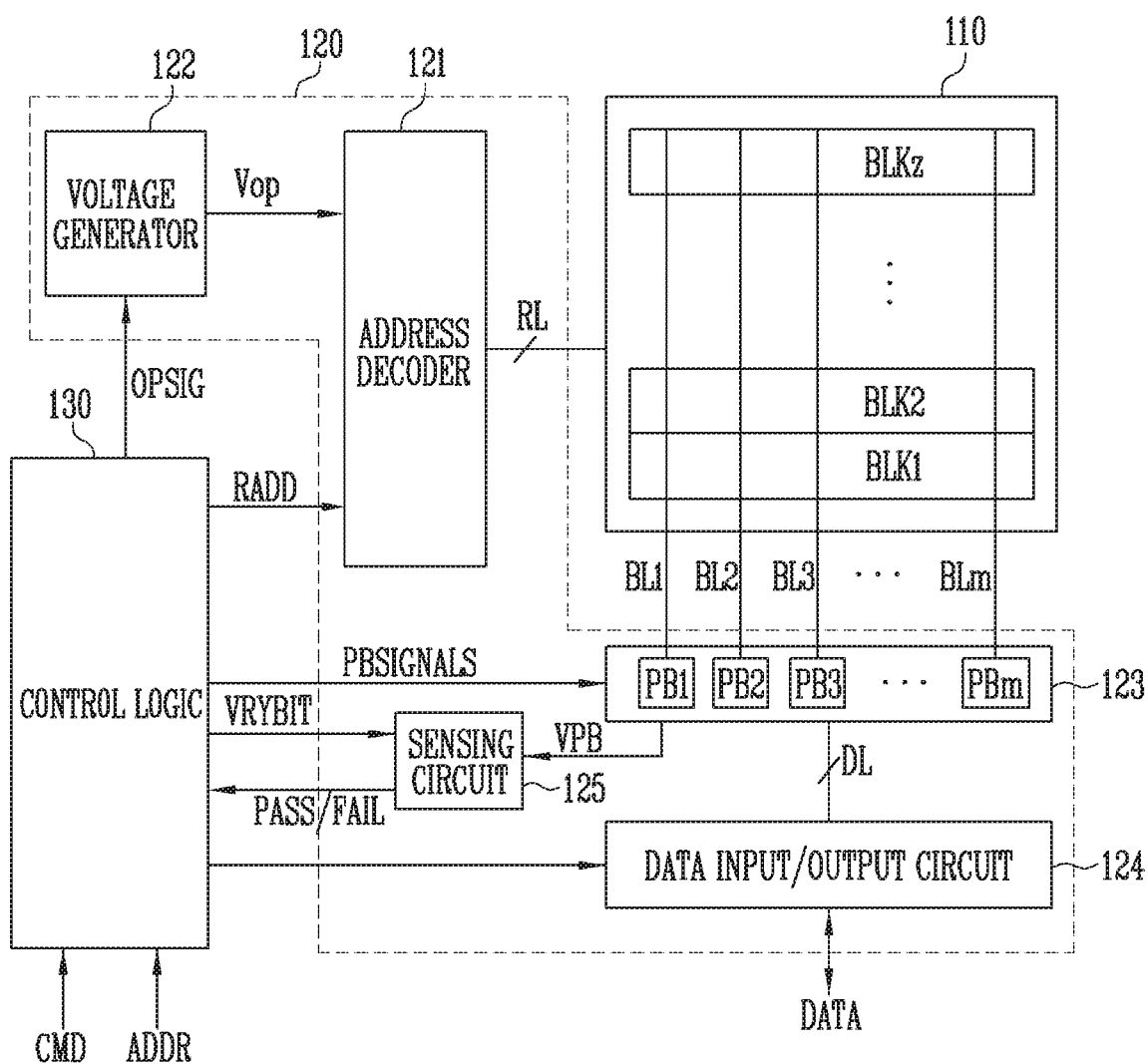
FIG. 2 is a diagram illustrating a configuration of a memory device, such as that of FIG. 1.

FIG. 2 is a diagram illustrating a configuration of the memory device 100 of FIG. 1.

Referring to FIG. 2, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to an address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 is formed of a plurality of pages. In an embodiment, each of the memory blocks BLK1 to BLKz in the memory cell array 110 may include a plurality of dummy cells. Here, one or more dummy cells may be coupled in series between a drain select transistor and memory cells and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, a read/write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address RADD among the received addresses ADDR. The address decoder 121 may select at least one word line WL of the selected memory block by applying voltages supplied from the voltage generator 122 to at least one word line WL according to the decoded row address RADD.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select a corresponding memory block according to the decoded block address. During the erase operation, the address decoder 121 may apply a ground voltage to word lines coupled to the selected memory block.

In an embodiment of the present disclosure, the address decoder 121 may decode a column address among the transmitted addresses ADDR. The decoded column address may be transmitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include, to generate a plurality of operating voltages Vop having various voltage levels, a plurality of pumping capacitors configured to receive an internal supply voltage, and may generate a plurality of operating voltages Vop by selectively enabling the plurality of pumping capacitors under control of the control logic 130.

The generated operating voltages Vop may be supplied to the memory cell array 110 by the address decoder 121.

The read/write circuit 123 may include first to m-th page buffers PB1 to PBm, which may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data DATA with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program enable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA to the first to m-th page buffers PB1 to PBm.

During an erase operation, the read/write circuit 123 may float the bit lines BL. In an embodiment, the read/write circuit 123 may include a column select circuit.

In an embodiment, while data stored in some page buffers of the plurality of page buffers in the read/write circuit 123 is programmed to the memory cell array 110, the other page buffers may receive new data from the memory controller 200 and store the new data.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving input data DATA. During a program operation, the data input/output circuit 124 may receive data DATA to be stored from an external controller (not shown). During a read operation, the data input/output circuit 124 may output, to the external controller, the data DATA received from the first to m-th page buffers PB1 to PBm included in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control the overall operation of the memory device 100. The control logic 130 may operate in response to a command CMD transmitted from an external device.

The control circuit 130 may generate various signals in response to the command CMD and the address ADD and control the peripheral circuit 120. For example, the control logic 130 may generate an operating signal OPSIG, a row address RADD, a read/write circuit control signal PBSIGNALS, and an enable bit signal VRYBIT in response to the command CMD and the address ADD. The control logic 130 may output the operating signal OPSIG to the voltage generator 122, output the row address RADD to the address decoder 121, output the read/write control signal to the read/write circuit 123, and output the enable bit VRYBIT to the sensing circuit 125. Furthermore, the control logic 130 may determine whether target memory cells have passed or failed a verification during the verify operation in response to a pass signal PASS or a fail signal FAIL that is output from the sensing circuit 125.

Figure 3:
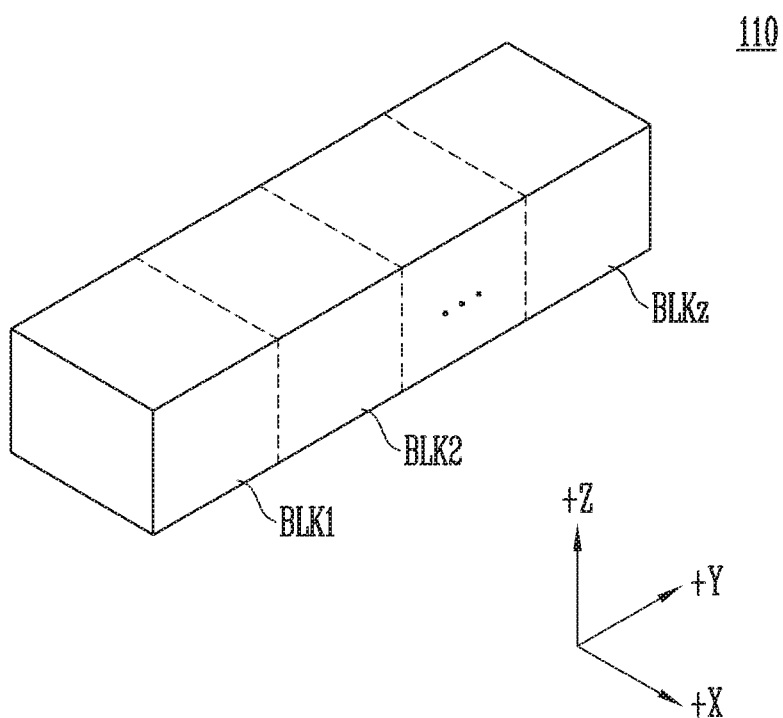
FIG. 3 is a diagram illustrating an embodiment of a memory cell array, such as that of FIG. 2.

FIG. 3 is a diagram illustrating an embodiment of the memory cell array 110 of FIG. 2.

Referring to FIG. 3, the memory cell array 110 may include a plurality of memory blocks BLK1 to BLKz. Each memory block has a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 4 and 5.

Figure 4:
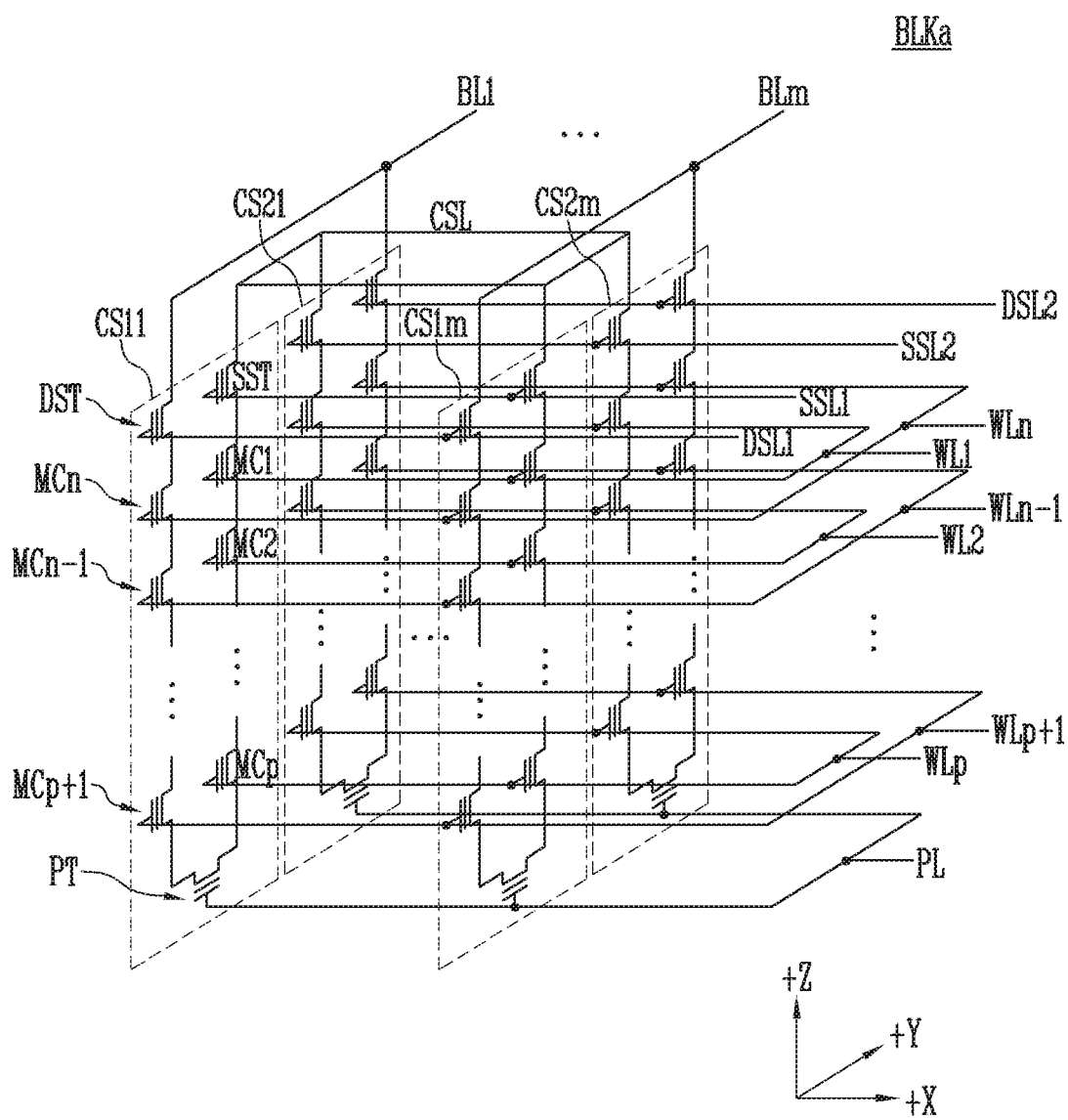
FIG. 4 is a circuit diagram illustrating a representative memory block BLKa of memory blocks BLK1 to BLKz of FIG. 3, in accordance with an embodiment of the present disclosure.

FIG. 4 is a circuit diagram illustrating a representative memory block BLKa of memory blocks BLK1 to BLKz of FIG. 3, in accordance with an embodiment of the present disclosure.

Referring to FIG. 4, the memory block BLKa may include a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings may be arranged in a row direction (i.e., the +X direction). In FIG. 4, two cell strings are illustrated as being arranged in a column direction (i.e., the +Y direction). However, this illustration is made for clarity; it will be understood that three or more cell strings may be arranged in the column direction.

Each of the plurality of cell strings CS11 to CS1$m$ and CS21 to CS2$m$ may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1$m$ in a first row are coupled to a first source select line SSL1. Source select transistors of the cell strings CS21 to CS2$m$ in a second row are coupled to a second source select line SSL2.

In an embodiment, the source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a −Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1$m$ in the first row are coupled to a first drain select line DSL1. Drain select transistors of the cell strings CS21 to CS2$m$ in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1$m$ and CS2$m$ in an m-th column are coupled to an m-th bit line BLm.

Memory cells coupled to the same word line in cell strings arranged in the row direction form a single page. For example, memory cells coupled to the first word line WL1, among the cell strings CS11 to CS1$m$ in the first row, form a single page. Memory cells coupled to the first word line WL1, among the cell strings CS21 to CS2$m$ in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even bit lines and odd bit lines may be provided in lieu of the first to m-th bit lines BL1 to BLm. Even-number-th cell strings of the cell strings CS11 to CS1$m$ or CS21 to CS2$m$ arranged in the row direction may be coupled to the respective even bit lines. Odd-number-th cell strings of the cell strings CS11 to CS1$m$ or CS21 to CS2$m$ arranged in the row direction may be coupled to the respective odd bit lines.

In an embodiment, at least one of the first to n-th memory cells MC1 to MCn may be used as a dummy memory cell. For example, one or more dummy memory cells may be provided to reduce an electric field between the source select transistor SST and the memory cells MC1 to MCp. Alternatively, one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the dummy memory cell(s), each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 5:
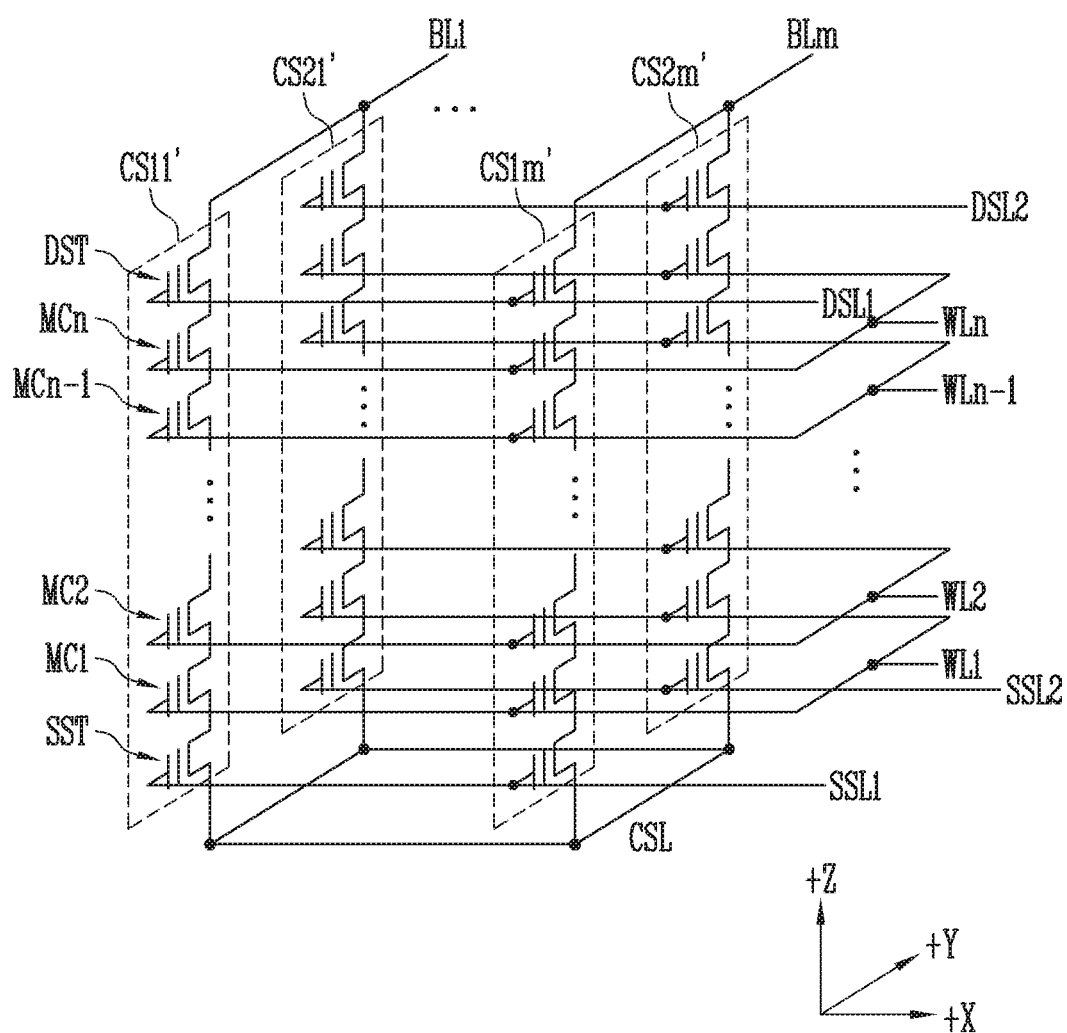
FIG. 5 is a circuit diagram illustrating a representative memory block BLKb of the memory blocks BLK1 to BLKz of FIG. 3, in accordance with another embodiment of the present disclosure.

FIG. 5 is a circuit diagram illustrating a representative memory block BLKb of the memory blocks BLK1 to BLKz of FIG. 3, in accordance with an embodiment of the present disclosure.

Referring to FIG. 5, the memory block BLKb may include a plurality of cell strings CS11' to CS1$m$' and CS21' to CS2$m$'. Each of the cell strings CS11' to CS1$m$' and CS21' to CS2$m$' extends in the +Z direction. Each of the cell strings CS11' to CS1$m$' and CS21' to CS2$m$' may include at least one source select transistor SST, first to n-th memory cells MC1 to MCn, and at least one drain select transistor DST which are stacked on a substrate (not shown) provided in a lower portion of the memory block BLKb.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1$m$' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequently, the memory block BLKb of FIG. 5 may have a circuit similar or equivalent to that of the memory block BLKa of FIG. 4 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, one or more dummy memory cells may be provided to reduce an electric field between the source select transistor SST and the memory cells MC1 to MCn. Alternatively, one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the dummy memory cell(s), each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 6:
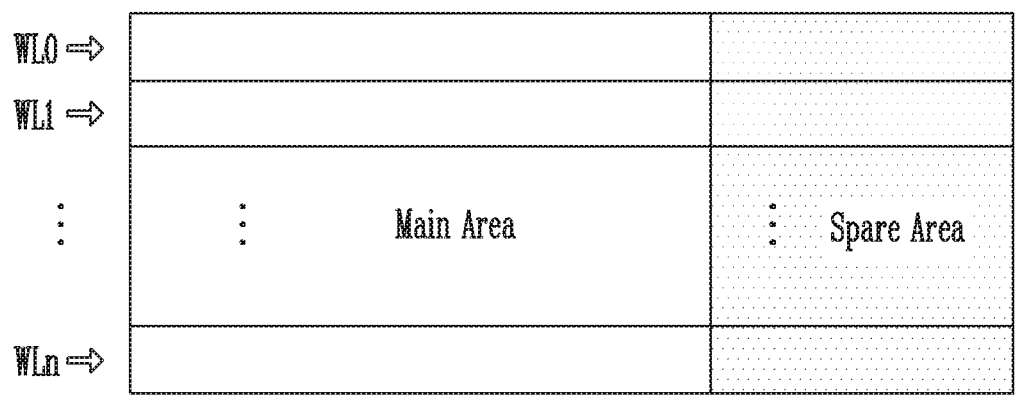
FIG. 6 is a schematic diagram illustrating areas of a representative memory block BLK1 of the memory blocks BLK1 to BLKz of FIG. 2 in accordance with an embodiment of the present disclosure.

FIG. 6 is a diagram illustrating a representative memory block BLK1 of the memory blocks BLK1 to BLKz of FIG. 2 in accordance with an embodiment of the present disclosure.

Referring to FIG. 6, the memory block BLK1 may include a main area (Main Area) and a spare area (Spare Area). The shaded portion may be the spare area. The unshaded portion may be the main area.

Among the memory cells in the memory block BLK1, memory cells in the main area may be main cells, and memory cells included in the spare area may be spare cells.

User data may be stored in the main cells. Information related to the user data may be stored in the spare cells.

The memory block BLK1 may include zeroth to n-th word lines WL0 to WLn (n is a natural number of 1 or more). Each word line may be coupled with main cells and spare cells.

Memory cells coupled to each word line may store data on a physical page basis. Depending on the number of data bits capable of being stored in each memory cell, each physical page may correspond to a plurality of logical pages. For example, if a memory cell is a triple-level cell capable of storing three data bits, one physical page may correspond to three logical pages. The three logical pages may be a least significant bit (LSB) page, a central significant bit (CSB) page, and a most significant bit (MSB) page.

In an embodiment, a plurality of pieces of logical page data may be stored in main cells coupled to a selected word line. The inversion information described with reference to FIG. 1 may be stored in spare cells coupled to the selected word line. The inversion information may indicate whether each of the plurality of pieces of logical page data has been inverted.

Figure 7:
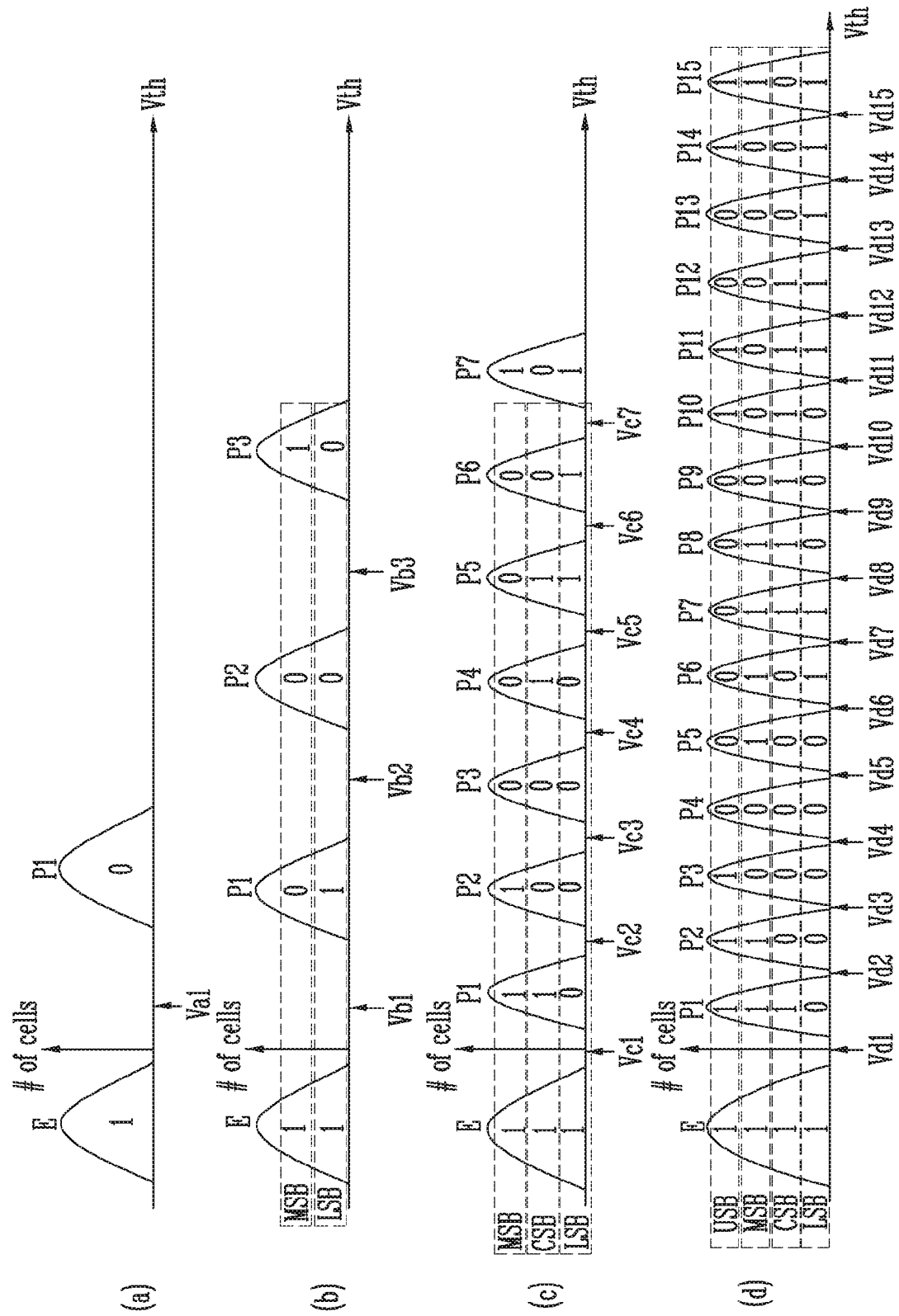
FIG. 7 is a diagram illustrating threshold voltage distributions of memory cells and logical page data in accordance with an embodiment of the present disclosure.

FIG. 7 is a diagram illustrating threshold voltage distributions of memory cells and logical page data in accordance with an embodiment of the present disclosure.

Referring to FIG. 7, the horizontal axis of each graph indicates the level of a threshold voltage, and the vertical axis thereof indicates the number of memory cells.

In graph (a) to (d), it is assumed that the number of data bits that may be stored in each memory cell ranges 1 to 4. However, this range is exemplary; more than 4 data bits may be stored in each memory cell.

Graph (a) illustrates threshold voltage distributions of single-level cells (SLCs) each of which is capable of storing a single data bit. A single-level cell may have any one state of an erased state E or a programmed state P1.

A read voltage Va1 may be for distinguishing the erased state E from the programmed state P1. When a single-level cell having the erased state E is read using the read voltage Va1, the single-level cell may be read as an ON cell. The ON cell may correspond to logical value '1'. When a single-level cell having the programmed state P1 is read using the read voltage Va1, the single-level cell may be read as an OFF cell. The OFF cell may correspond to logical value '0'.

Graph (b) illustrates threshold voltage distributions of multi-level cells (MLCs) each of which is capable of storing two data bits. The multi-level cell may have any one state of an erased state E and first to third programmed states P1 to P3.

First to third read voltages Vb1 to Vb3 may be for distinguishing the erased state E and the first to third programmed states P1 to P3 from each other. The first read voltage Vb1 may distinguish the erased state E from the first programmed state P1. The second read voltage Vb2 may distinguish the first programmed state P1 from the second programmed state P2. The third read voltage Vb3 may distinguish the second programmed state P2 from the third programmed state P3.

Depending on a result of reading a multi-level cell using the first to third read voltages Vb1 to Vb3, the multi-level cell may be determined to have any one state of the erased state E and the first to third programmed states P1 to P3.

The erased state E and the first to third programmed states P1 to P3 may respectively correspond to logical data '11', '01', '00', and '10'. However, the relationship between the states and their respective logical data is not limited to this specific arrangement.

Logical pages which are stored in multi-level cells coupled to one word line may be a most significant bit (MSB) page and a least significant bit (LSB) page. The MSB page may store the most significant data bit of two data bits which may be stored in each multi-level cell. The LSB page may store the least significant data bit of two data bits which may be stored in each multi-level cell.

Graph (c) illustrates threshold voltage distributions of triple-level cells (TLCs) each of which is capable of storing three data bits. The triple-level cell may have any one state of an erased state E and first to seventh programmed states P1 to P7.

First to seventh read voltages Vc1 to Vc7 may be for distinguishing the erased state E and the first to seventh programmed states P1 to P7 from each other. The first read voltage Vc1 may distinguish the erased state E from the first programmed state P1. The second read voltage Vc2 may distinguish the first programmed state P1 from the second programmed state P2. Likewise, the seventh read voltage Vc7 may distinguish the sixth programmed state P6 from the seventh programmed state P7.

Depending on a result of reading a triple-level cell using the first to seventh read voltages Vc1 to Vc7, the triple-level cell may be determined to have any one state of the erased state E and the first to seventh programmed states P1 to P7.

The erased state E and the first to seventh programmed states P1 to P7 may respectively correspond to logical data '111', '110', '100', '000', '010', '011', '001', and '101'. However, the relationship between the states and their respective logical data is not limited to this specific arrangement.

Logical pages which are stored in triple-level cells coupled to each word line may be an MSB page, a central significant bit (CSB) page, and an LSB page. The MSB page may store the most significant data bit of three data bits which may be stored in each triple-level cell. The CSB page may store the central significant data bit of three data bits which may be stored in each triple-level cell. The LSB page may store the least significant data bit of three data bits which may be stored in each triple-level cell.

Graph (d) illustrates threshold voltage distributions of quad-level cells (QLCs) each of which is capable of storing four data bits. The quad-level cell may have any one state of an erased state E and first to fifteenth programmed states P1 to P15.

First to fifteenth read voltages Vd1 to Vd15 may be for distinguishing the erased state E and the first to fifteenth programmed states P1 to P15 from each other. The first read voltage Vd1 may distinguish the erased state E from the first programmed state P1. The second read voltage Vd2 may distinguish the first programmed state P1 from the second programmed state P2. Likewise, the fifteenth read voltage Vd15 may distinguish the fourteenth programmed state P14 from the fifteenth programmed state P15.

Depending on a result of reading a quad-level cell using the first to fifteenth read voltages Vd1 to Vd15, the quad-level cell may be determined to have any one state of the erased state E and the first to fifteenth programmed states P1 to P15.

The erased state E and the first to fifteenth programmed states P1 to P15 may respectively correspond to logical data '1111', '1110', '1100', '1000', '0000', '0100', '0101', '0111', '0110', '0010', '1010', '1011', 0011', '0001', '1001', and '1101'. However, the relationship between the states and their respective logical data is not limited to this specific arrangement.

Logical pages which are stored in quad-level cells coupled to each word line may be an upper significant bit (USB) page, an MSB page, a CSB page, and an LSB page. The USB page may store the first significant data bit of four data bits which may be stored in each quad-level cell. The MSB page may store the second significant data bit of four data bits which may be stored in each quad-level cell. The CSB page may store the third significant data bit of four data bits which may be stored in each quad-level cell. The LSB page may store the fourth significant data bit of four data bits which may be stored in each quad-level cell.

Comparing graphs (a) to (d) with each other, as the number of data bits that may be stored in each memory cell is increased, the number of programmed states that may be represented by each memory cell and the number of read voltages for distinguishing the respective programmed states from each other may be increased. As the number of programmed states that may be represented by each memory cell is increased, the entire width in which the threshold voltage distributions corresponding to the respective programmed states are disposed may be increased. On the one hand, as the number of programmed states that may be represented by each memory cell is increased, the width of the threshold voltage distribution corresponding to each programmed state may be reduced.

Figure 8:
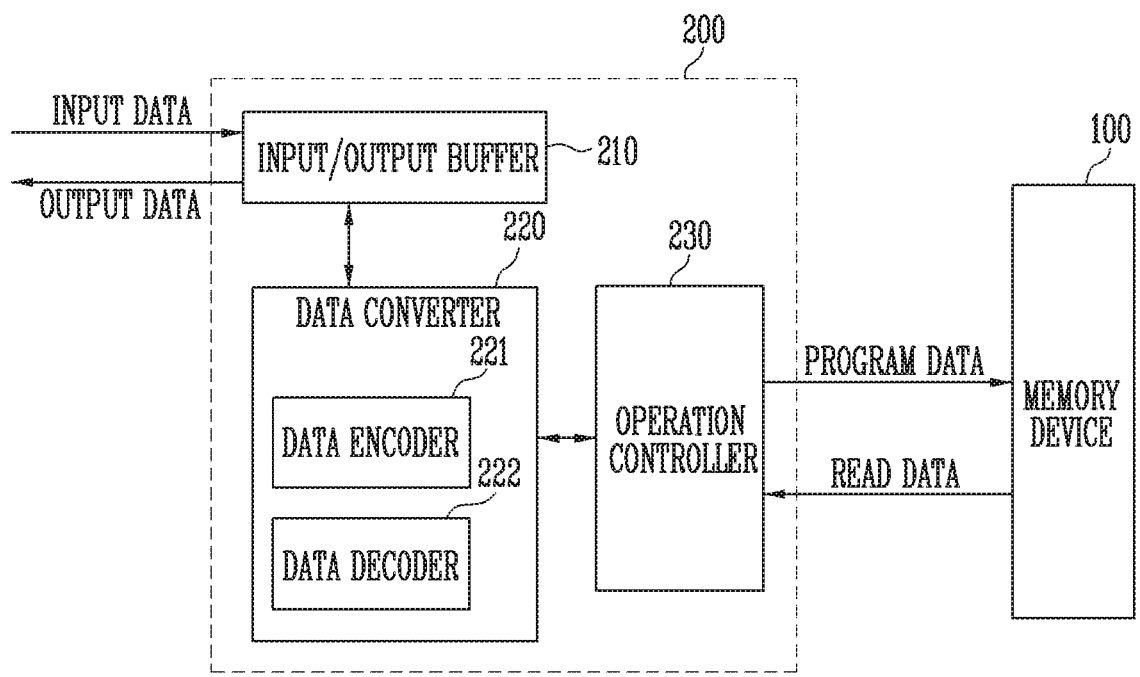
FIG. 8 is a diagram illustrating a configuration and operation of a memory controller in accordance with an embodiment of the present disclosure.

FIG. 8 is a diagram illustrating the configuration and operation of a memory controller, e.g., memory controller 200, in accordance with an embodiment of the present disclosure.

Referring to FIG. 8, the memory controller 200 may include the input/output buffer 210, the data converter 220, and the operation controller 230.

The input/output buffer 210 may store data which is input in response to a write request of the host. The input/output buffer 210 may provide the stored data to the data converter 220. The input/output buffer 210 may store data to be output to the host 300 in response to a read request of the host 300. The input/output buffer 210 may receive data from the data converter 220.

The data converter 220 may include a data encoder 221 and a data decoder 222.

The data encoder 221 may convert data provided from the input/output buffer 210 and generate program data to be stored in the memory device 100. The data encoder 221 may generate the program data by converting the inputted data such that the number of specific data pattern among data patterns to be stored in the memory device 100 is increased. In an embodiment, the data encoder 221 may generate the program data by converting the input data such that the number of specific data patterns among data patterns to be stored in the memory device 100 is reduced. The specific data patterns may be preset data patterns.

The data encoder 221 may generate converted data by selectively inverting a plurality of pieces of logical page data in the input data such that the number of specific data patterns is increased or reduced. The data encoder 221 may generate inversion information indicating whether each of the plurality of pieces of logical page data has been inverted. The data encoder 221 may generate program data including the converted data and the inversion information, and provide the generated program data to the operation controller 230.

The data decoder 222 may receive, from the operation controller 230, read data obtained by reading data stored in the memory cells. Here, the read data may include a plurality of pieces of logical page data and inversion information corresponding to each of the plurality of pieces of logical page data. The inversion information may indicate whether the corresponding logical page data has been inverted.

The data decoder 222 may generate output data by converting the read data using the inversion information in the read data. In an embodiment, the data decoder 222 may generate the output data by selectively inverting the plurality of pieces of logical page data in the read data based on the inversion information. The data decoder 222 may provide the generated output data to the input/output buffer 210.

The operation controller 230 may store program data received from the data encoder 221 in memory cells included in the memory device 100. The operation controller 230 may provide, to the memory device 100, a program command for storing program data in the memory device 100. Here, converted data included in the program data may be stored in the main cells described with reference to FIG. 6, and inversion information may be stored in the spare cells described with reference to FIG. 6.

The operation controller 230 may provide, to the memory device 100, a read command for reading program data stored in the memory cells included in the memory device 100 in response to a read request of the host. As a result of performing the read command, the operation controller 230 may provide, to the data decoder 222, read data obtained by reading the program data stored in the memory device.

Figure 9:
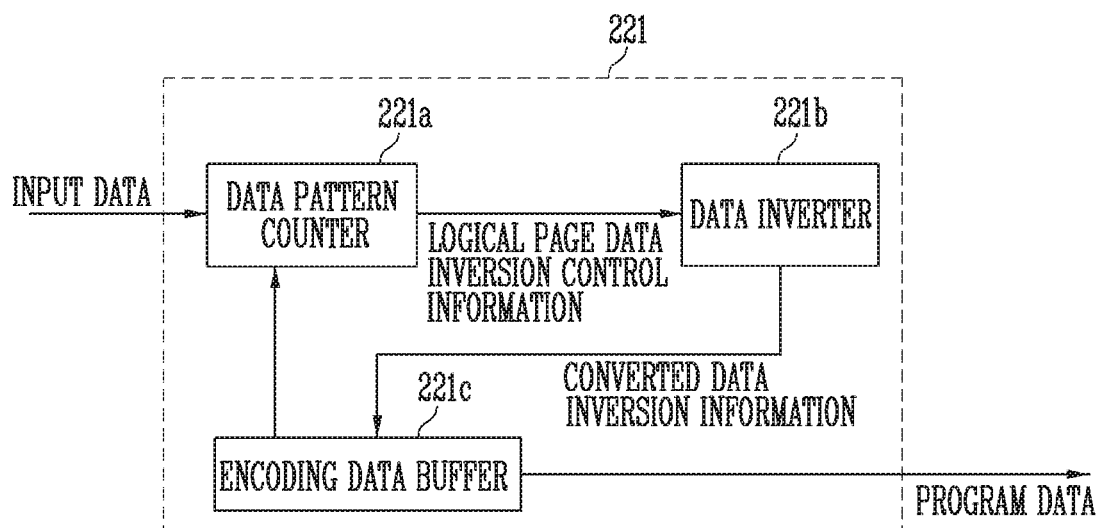
FIG. 9 is a diagram illustrating a configuration and operation of a data encoder of FIG. 8.

FIG. 9 is a diagram illustrating a configuration and operation of the data encoder 221 of FIG. 8.

Referring to FIG. 9, the data encoder 221 may include a data pattern counter 221a, a data inverter 221b, and an encoding data buffer 221c.

The data pattern counter 221a may count the number of specific data patterns by combining input data provided from the input/output buffer described with reference to FIG. 8 with converted data stored in the encoding data buffer 221c. Each of the specific data patterns may be a preset data pattern.

In detail, the data pattern counter 221a may count the number of specific data patterns by combining logical page data on which a data conversion operation has not been performed among a plurality of pieces of logical page data included in the input data with converted data obtained by performing the data conversion operation among the plurality of pieces of logical page data included in the input data.

The data pattern counter 221a may control the data inverter 221b to selectively invert each of the plurality of pieces of logical page data included in the input data such that the number of specific data patterns among data patterns to be stored in the memory cells described with reference to FIG. 8 is increased or reduced.

In other words, the data pattern counter 221a may generate inversion control information and provide the inversion control information to the data inverter 221b such that the number of specific data patterns is increased or reduced. The inversion control information may be information indicating whether to invert each of the plurality of pieces of logical page data provided from the data pattern counter 221 to the data inverter 221b. The data pattern counter 221a may provide each of the pieces of the logical page data included in the input data to the data inverter 221b.

In an embodiment, the data pattern counter 221a may successively provide the plurality of pieces of logical page data included in the input data to the data inverter 221b according to the priority of the logical page data. The data pattern counter 221a may provide the plurality of pieces of logical page data to the data inverter 221b in an order from logical page data of the least significant priority to logical page data of the most significant priority.

The data pattern counter 221a may provide, to the data inverter 221b, inversion control information corresponding to each of the plurality of pieces of logical page data provided to the data inverter 221b.

The inversion control information may indicate whether to invert logical page data corresponding to the inversion control information. In an embodiment, if the inversion control information has logical value '1', it may indicate that the logical value of the logical page data is to be inverted, whereas if the inversion control information has logical value '0', it may indicate that the logical value of the logical page data is not to be inverted. In an embodiment, if the inversion control information has logical value '0', it may indicate that the logical value of the logical page data is to be inverted, whereas if the inversion control information has logical value '1', it may indicate that the logical value of the logical page data is not to be inverted.

The data inverter 221b may receive the logical page data and the inversion control information from the data pattern counter 221a.

The data inverter 221b may convert the provided logical page data based on the inversion control information and generate converted data, and may provide the generated converted data to the encoding data buffer 221c. The data inverter 221b may provide inversion information along with the converted data to the encoding data buffer 221c.

The inversion information may indicate whether the converted data that is logical page data obtained by performing the data conversion operation has been inverted. In an embodiment, if the inversion information has logical value '1', it may indicate that the converted data has been inverted, whereas if the inversion information has logical value '0', it may indicate that the converted data has not been inverted. In an embodiment, if the inversion information has logical value '0', it may indicate that the converted data has been inverted, whereas if the inversion information has logical value '1', it may indicate that the converted data has not been inverted.

In an embodiment, the data inverter 221b may provide, along with the inversion information, converted data obtained by inverting the logical values of the provided logical page data based on the inversion control information to the encoding data buffer 221c.

For example, in the case where input logical page data is '11110000', if the inversion control information has logical value '1', the data inverter 221b may invert the logical values of the input logical page data to generate converted data '00001111' and provide the same to the encoding data buffer 221c. The data inverter 221b may provide, along the converted data, inversion information having logical value '1' indicating that the converted data has been inverted.

In an embodiment, in the case where input logical page data is '11110000', if the inversion control information has logical value '0', the data inverter 221b may not invert the logical values of the input logical page data and thus may provide data '11110000' to the encoding data buffer 221c. The data inverter 221b may provide, along with the data, inversion information having logical value '0' indicating that the converted data has not been inverted.

The encoding data buffer 221c may store the converted data and the inversion information that are provided from the data inverter 221b. The encoding data buffer 221c may provide the data stored in the encoding data buffer 221c to the data pattern counter 221a.

The encoding data buffer 221c may provide program data including the converted data and the inversion information received from the data inverter 221b to the operation controller 230 described with reference to FIG. 8. Since, in the case of the 3D memory block described with reference to FIG. 3, a one-shot program operation is performed, the program data may include all of the converted/non-converted data and the inversion information that correspond to the plurality of respective logical page data. The one-shot program operation may be an operation of programming a plurality of pieces of logical page data through a single process.

When all of the data conversion operations for the plurality of respective logical page data included in the input data are completed, the encoding data buffer 221c may provide the program data to the operation controller 230.

Figure 10:
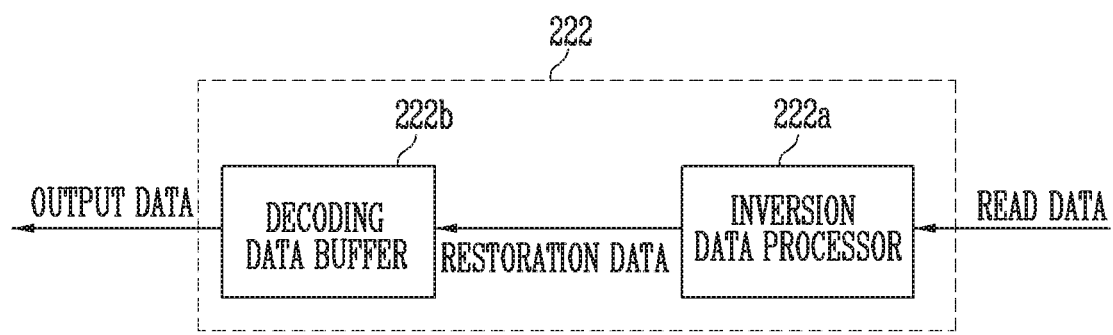
FIG. 10 is a diagram illustrating a configuration and operation of a data decoder of FIG. 8.

FIG. 10 is a diagram illustrating a configuration and operation of the data decoder 222 of FIG. 8.

Referring to FIG. 10, the data decoder 222 may include an inversion data processor 222a and a decoding data buffer 222b.

The inversion data processor 222a may receive read data from the operation controller described with reference to FIG. 8. The read data may be data obtained by reading data stored in the memory cells described with reference to FIG. 8. The read data may include a plurality of logical pages and inversion information corresponding to the plurality of respective logical pages. The inversion information may indicate whether the logical pages corresponding to the inversion information have been inverted.

The inversion data processor 222a may generate restoration data obtained by selectively inverting pieces of logical page data in the read data according to the inversion information included in the read data.

For example, the pieces of logical page data in the read data may include MSB page data, CSB page data, and LSB page data.

When the MSB page data is '11111111' and the inversion information corresponding thereto has logical value '1', restoration data corresponding to the MSB page data may be '00000000'.

When the CBS page data is '00000000' and the inversion information corresponding thereto has logical value '1', restoration data corresponding to the CSB page data may be '11111111'.

When the LBS page data is '10101010' and the inversion information corresponding thereto has logical value '0', restoration data corresponding to the LSB page data may be '10101010'.

The decoding data buffer 222b may receive restoration data from the inversion data processor 222a and store the received restoration data.

The decoding data buffer 222b may provide output data to the input/output buffer 210 described with reference to FIG. 8. The output data may include all of the restoration data corresponding to the plurality of respective logical page data. When all of the data conversion operations for the plurality of respective logical page data included in the read data are completed, the decoding data buffer 222b may provide the output data to the input/output buffer 210.

In an embodiment, the output data may be restoration data corresponding to each of the plurality of pieces of logical page data. Each time the data conversion operation for each of the plurality of pieces of logical page data included in the read data is completed, the decoding data buffer 222b may provide output data to the input/output buffer 210.

Figure 11:
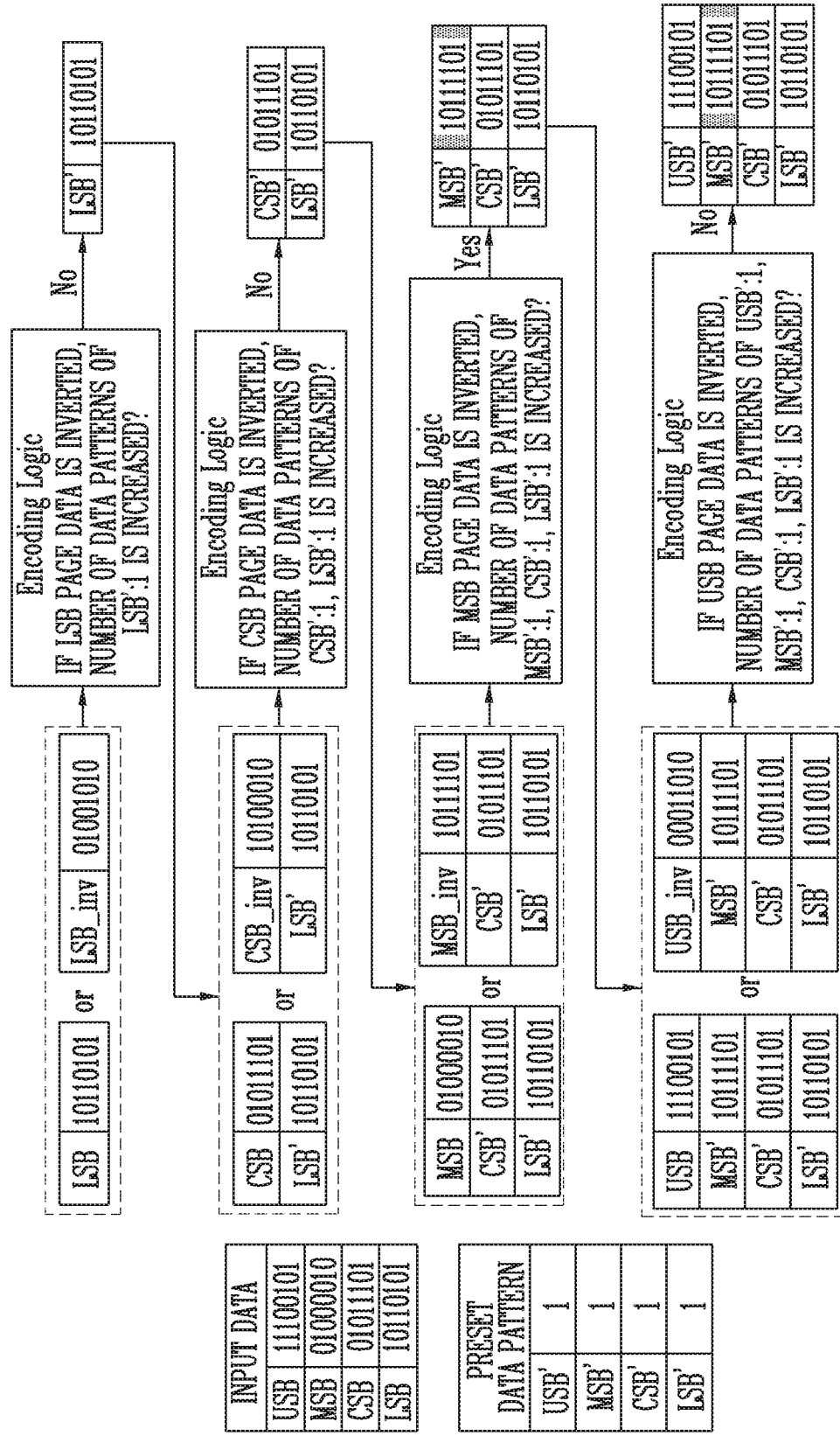
FIG. 11 is a diagram illustrating a process of converting data such that the number of specific data patterns is increased, in accordance with an embodiment of the present disclosure.

FIG. 11 is a diagram illustrating a process of converting data such that the number of specific data patterns is increased, in accordance with an embodiment of the present disclosure.

Referring to FIG. 11, logical page data included in the input data may include USB page data, MSB page data, CSB page data, and LSB page data.

In an embodiment, the USB page data may be '11100101'. The MSB page data may be '01000010'. The CSB page data may be 01011101'. The LSB page data may be '10110101'.

The number of logical page data included in the input data and the logical values of the respective logical page data are not limited to those of this present embodiment.

In an embodiment, the data conversion operation may be performed in an order from logical page data of the least significant priority to logical page data of the most significant priority. In another embodiment, the data conversion operation may be performed in the opposite order. However, the order of logical page data on which the data conversion operations are to be performed is not limited to the above orders.

Referring to FIG. 11, the data conversion operation may be performed such that the number of specific data patterns is increased. Each of the specific data patterns may be a preset data pattern. In an embodiment, the preset data patterns may comprise USB' data having a value of '1', MSB' data having a value of '1', CSB' data having a value of '1', and LSB' data having a value of '1'. For example, the USB' data may represent conversion-completed data of the input USB data. The preset data patterns are not limited to that of this embodiment.

Since the number of items of logical page data included in the input data is four (i.e., LSB, CSB, MSB and USB page data), a total of four data conversion operations may be performed. A corresponding piece of the input logical page data on which a data conversion operation has been performed may be converted data. Inversion information corresponding to the converted data may indicate whether the converted data has been inverted. If the inversion information has logical value '1', it may indicate that the converted data has been inverted. If the inversion information has logical value '0', it may indicate that the converted data has not been inverted.

For example, during a first data conversion operation, it may be determined whether, when the LSB page data is inverted to LSB_inv, the number of 1's included in converted data LSB' is increased according to LSB' having a value of '1' in the preset data pattern.

The number of 1's in LSB page data '10110101' is five, and the number of 1's in inverted LSB page data LSB_inv '01001010' is three. If the LSB page data is inverted to LSB_inv, the number of 1's in the converted data LSB' is not increased. Hence, during the first data conversion operation, the LSB page data is not inverted. Therefore, the converted data LSB' is '10110101', and the inversion information corresponding to the converted data LSB' may have logical value '0'.

During a second data conversion operation, it may be determined whether or not, when the CSB page data is inverted to CSB_inv, the number of CSB' data and LSB' data (preset data patterns) in converted data LSB' and CSB' is increased.

When converted data LSB' '10110101' and CSB page data '01011101' are combined, the number of CSB' data and LSB' data (preset data patterns) is three. When converted data LSB' '10110101' and inverted CSB page data CSB_inv '10100010' are combined, the number of CSB' data and LSB' data (preset data patterns) is two.

If the CSB page data is inverted to CSB_inv, the number of CSB' data and LSB' data (preset data patterns) in the converted data LSB' and CSB' is not increased. Hence, during the second data conversion operation, the CSB page data is not inverted. Therefore, the converted data CSB' is '01011101', and the inversion information corresponding to the converted data CSB' may have logical value '0'.

During a third data conversion operation, it may be determined whether or not, when the MSB page data is inverted to MSB_inv, the number of MSB' data, CSB' data, and LSB' data (preset data patterns) in converted data LSB, CSB', and MSB' is increased.

When converted data LSB' '10110101', converted data CSB' 01011101', and MSB page data '01000010' are combined, the number of MSB' data, CSB' data, and LSB' data (preset data patterns) is zero. When converted data LSB' and CSB' and the inverted MSB page data MSB_inv '10111101' are combined, the number of MSB' data, CSB' data, and LSB' (preset data patterns) is three.

If the MSB page data is inverted to MSB_inv, the number of MSB' data, CSB' data and LSB' data (preset data patterns) in the converted data LSB', CSB', and MSB' is increased. Hence, during the third data conversion operation, the MSB page data is inverted. Therefore, the converted data MSB' is '10111101', and the inversion information corresponding to the converted data MSB' may have logical value '1'.

During a fourth data conversion operation, it may be determined whether or not, when the USB page data is inverted to USB_inv, the number of USB' data, MSB' data, CSB' data, and LSB' data (preset data patterns) in converted data LSB, CSB', MSB', and USB' is increased.

When converted data LSB' '10110101', converted data CSB' '010111101', converted data MSB' '10111101', and USB page data '11100101' are combined, the number of USB' data, MSB' data, CSB' data, and LSB' data (preset data patterns) is two. When converted data LSB, CSB', and MSB' and the inverted USB page data USB_inv '00011010' are combined, the number of USB' data, MSB' data, CSB' data, and LSB' data (preset data patterns) is one.

If the USB page data is inverted to USB_inv, the number of USB' data, MSB' data, CSB' data, and LSB' data (preset data patterns) in the converted data LSB', CSB, MSB', and USB' is not increased. Hence, during the fourth data conversion operation, the USB page data is not inverted. Therefore, the converted data USB' is '11100101', and the inversion information corresponding to the converted data USB' may have logical value '0'.

Figure 12:
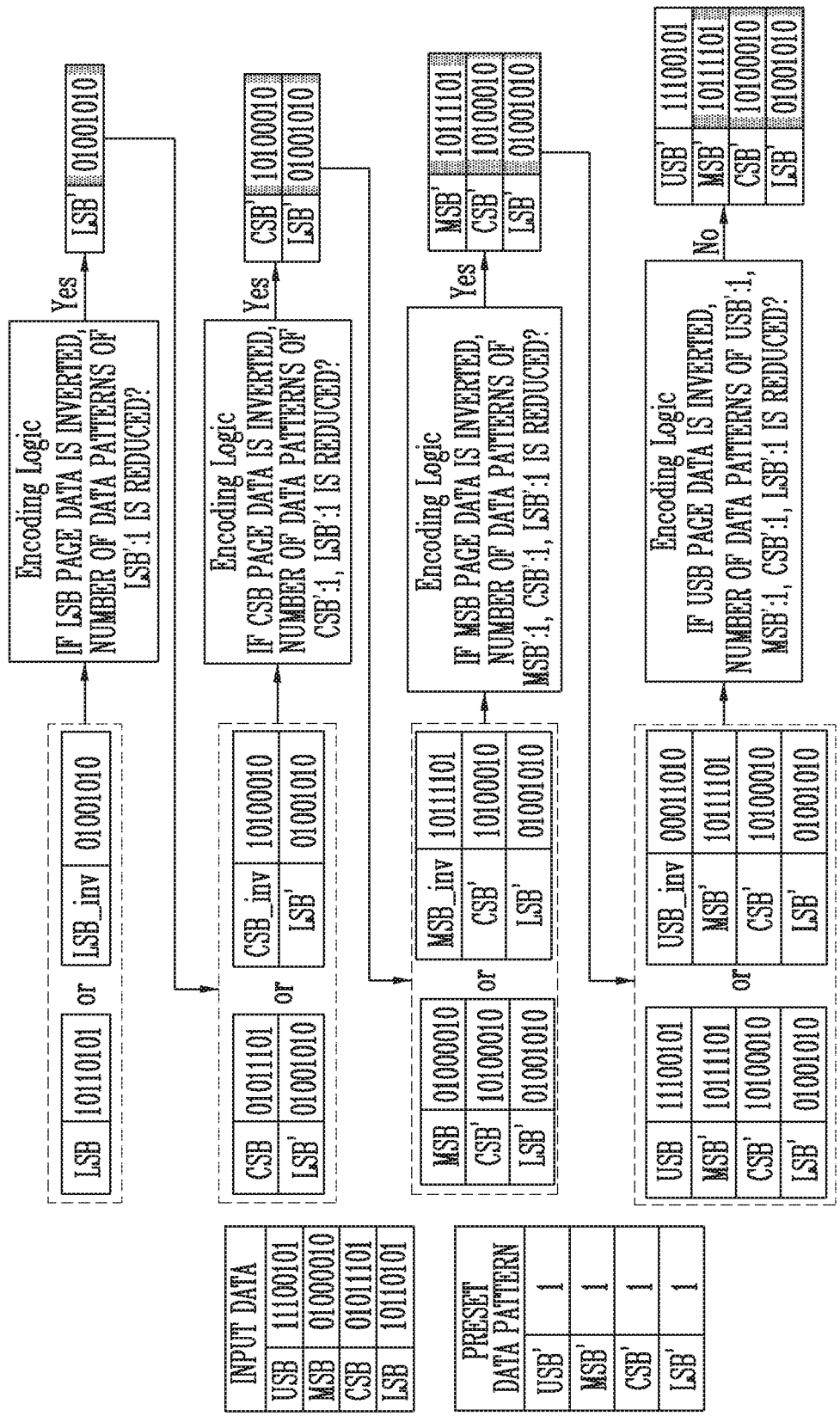
FIG. 12 is a diagram illustrating a process of converting data such that the number of specific data patterns is reduced, in accordance with an embodiment of the present disclosure.

FIG. 12 is a diagram illustrating a process of converting data such that the number of specific data patterns is reduced, in accordance with an embodiment of the present disclosure.

Referring to FIG. 12, although input data and specific data patterns are the same as those of FIG. 11, the data conversion operation may be performed such that the number of specific data patterns is reduced. The specific data patterns may be preset data patterns.

For example, during a first data conversion operation, it may be determined whether, when the LSB page data is inverted to LSB_inv, the number of 1's in converted data LSB' is reduced according to LSB' data having a value of '1' of the preset data pattern.

The number of 1's in LSB page data '10110101' is five, and the number of 1's included in inverted LSB page data LSB_inv '01001010' is three. If the LSB page data is inverted to LSB_inv, the number of 1's in the converted data LSB' is reduced. Hence, during the first data conversion operation, the LSB page data is inverted. Therefore, the converted data LSB' is '01001010', and the inversion information corresponding to the converted data LSB' may have logical value '1'.

During a second data conversion operation, it may be determined whether or not, when the CSB page data is inverted to CSB_inv, the number of CSB' data and LSB' data (preset data patterns) in converted data LSB' and CSB' is reduced.

When converted data LSB' '01001010' and CSB page data '01011101' are combined, the number of CSB' data and LSB' data (preset data patterns) is two. When converted data LSB' '01001010' and inverted CSB page data CSB_inv '10100010' are combined, the number of CSB' data and LSB' data (preset data patterns) is one.

If the CSB page data is inverted to CSB_inv, the number of CSB' data and LSB' data (preset data patterns) in the converted data LSB' and CSB' is reduced. Hence, during the second data conversion operation, the CSB page data is inverted. Therefore, the converted data CSB' is '10100010', and the inversion information corresponding to the converted data CSB' may have logical value '1'.

During a third data conversion operation, it may be determined whether or not, when the MSB page data is inverted to MSB_inv, the number of MSB' data, CSB' data, and LSB' data (preset data patterns) in converted data LSB, CSB', and MSB' is reduced.

When converted data LSB' '01001010', converted data CSB' '10100010', and MSB page data '01000010' are combined, the number of MSB' data, CSB' data, and LSB' data (preset data patterns) is one. When converted data LSB' and CSB' and the inverted MSB page data MSB_inv '10111101' are combined, the number of MSB' data, CSB' data, and LSB' data (preset data patterns) is zero.

If the MSB page data is inverted, the number of preset data patterns included in the converted data LSB', CSB, and MSB' is reduced. Hence, during the third data conversion operation, the MSB page data is inverted. Therefore, the converted data MSB' is '10111101', and the inversion information corresponding to the converted data MSB' may have logical value '1'.

During a fourth data conversion operation, it may be determined whether, when the USB page data is inverted, the number of USB' data, MSB' data, CSB' data, and LSB' data (preset data patterns) in converted data LSB', CSB', MSB', and USB' is reduced.

When converted data LSB' '01001010', converted data CSB' '10100010', converted data MSB' '10111101', and USB page data '11100101' are combined, the number of preset data patterns is zero. When converted data LSB, CSB', and MSB' and inverted USB page data USB_inv '00011010' are combined, the number of preset data patterns is zero.

If the USB page data is inverted, the number of preset data patterns included in the converted data LSB', CSB', MSB', and USB' is not reduced. Hence, during the fourth data conversion operation, the USB page data is not inverted. Therefore, the converted data USB' is '11100101', and the inversion information corresponding to the converted data USB' may have logical value '0'.

Figure 13:
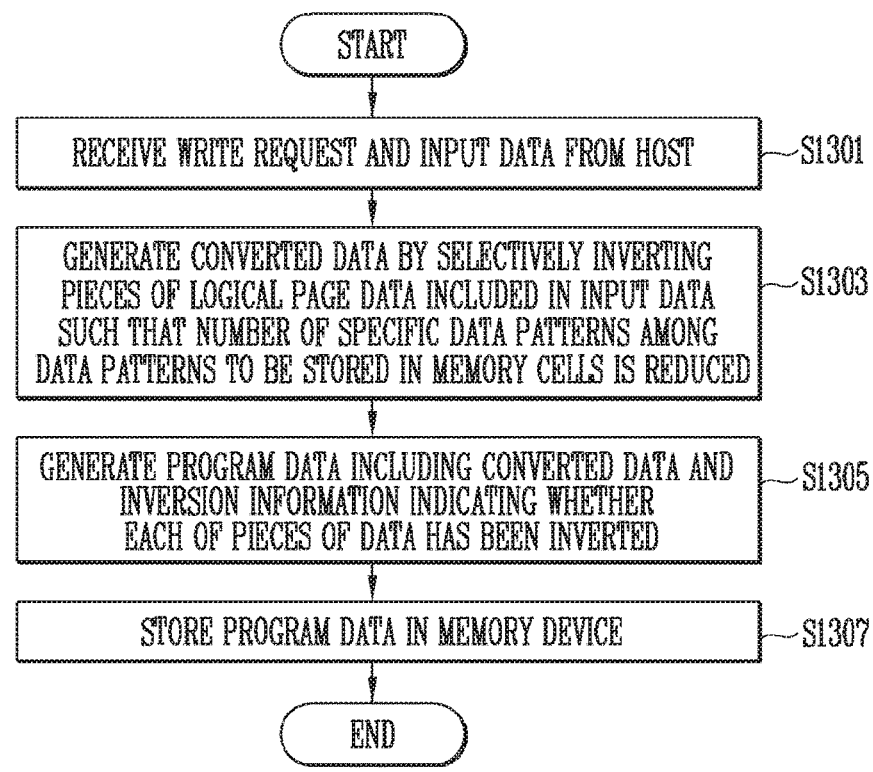
FIG. 13 is a flowchart illustrating an operation of the memory controller in accordance with an embodiment of the present disclosure.

FIG. 13 is a flowchart illustrating an operation of the memory controller in accordance with an embodiment of the present disclosure.

Referring to FIG. 13, at step S1301, the memory controller may receive a write request and input data corresponding to the write request from the host.

At step S1303, the memory controller may generate converted data by selectively inverting pieces of logical page data included in the input data such that the number of specific data patterns among data patterns to be stored in memory cells of the memory device is reduced.

At step S1305, the memory controller may generate program data including the converted data and inversion information indicating whether each of the plurality of pieces of logical page data has been inverted.

At step S1307, the memory controller may store the program data in the memory device.

Figure 14:
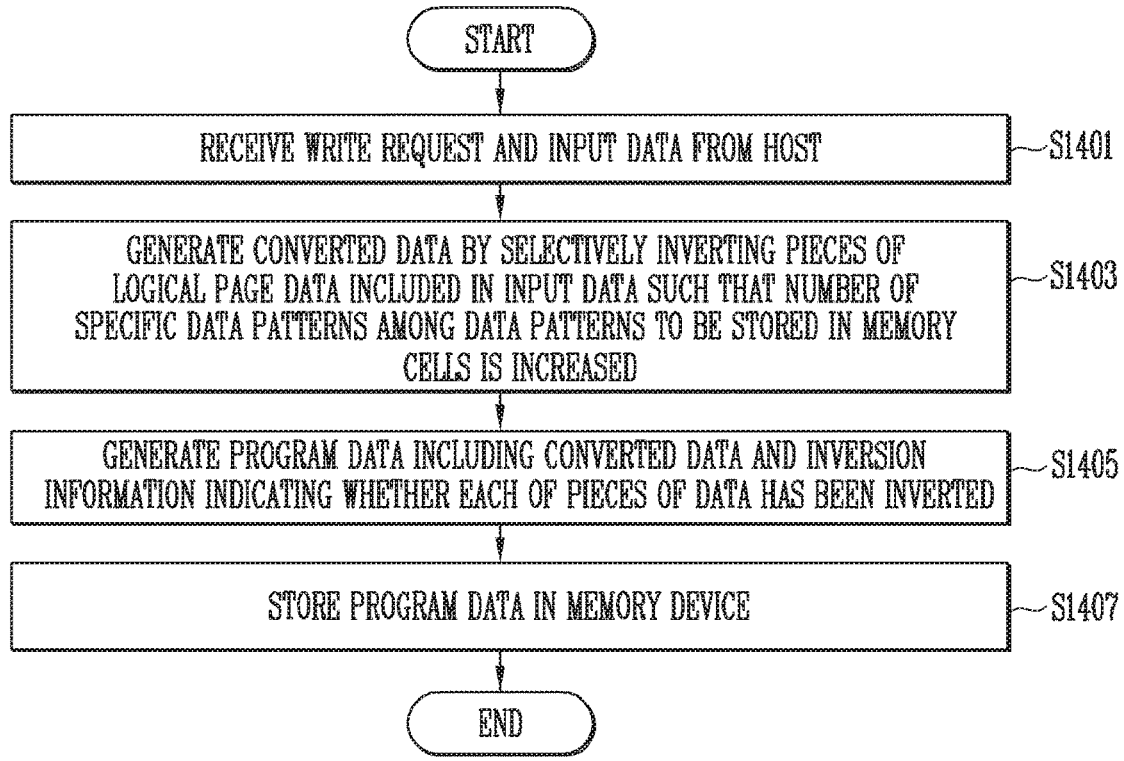
FIG. 14 is a flowchart illustrating an operation of the memory controller in accordance with an embodiment of the present disclosure.

FIG. 14 is a flowchart illustrating an operation of the memory controller in accordance with an embodiment of the present disclosure.

Referring to FIG. 14, at step S1401, the memory controller may receive a write request and input data corresponding to the write request from the host.

At step S1403, the memory controller may generate converted data by selectively inverting a plurality of pieces of logical page data included in the input data such that the number of specific data patterns among data patterns to be stored in memory cells of the memory device is increased.

At step S1405, the memory controller may generate program data including the converted data and inversion information indicating whether each of the plurality of pieces of logical page data has been inverted.

At step S1407, the memory controller may store the program data in the memory device.

Figure 15:
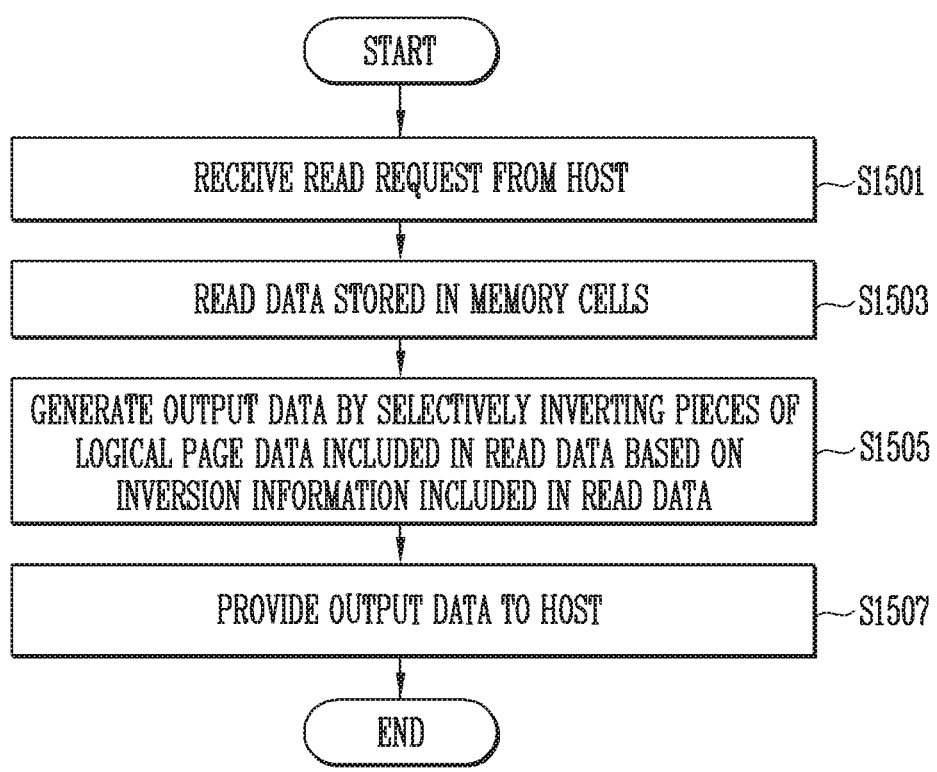
FIG. 15 is a flowchart illustrating an operation of the memory controller in accordance with an embodiment of the present disclosure.

FIG. 15 is a flowchart illustrating an operation of the memory controller in accordance with an embodiment of the present disclosure.

Referring to FIG. 15, at step S1501, the memory controller may receive a read request from the host.

At step S1503, the memory controller may read data stored in memory cells of the memory device in response to a read request of the host.

At step S1505, the memory controller may generate output data by selectively inverting a plurality of pieces of logical page data included in the read data based on inversion information included in the read data. The inverse information may be information indicating whether each of the plurality of pieces of logical page data has been inverted.

At step S1507, the memory controller may provide output data to the host.

Figure 16:
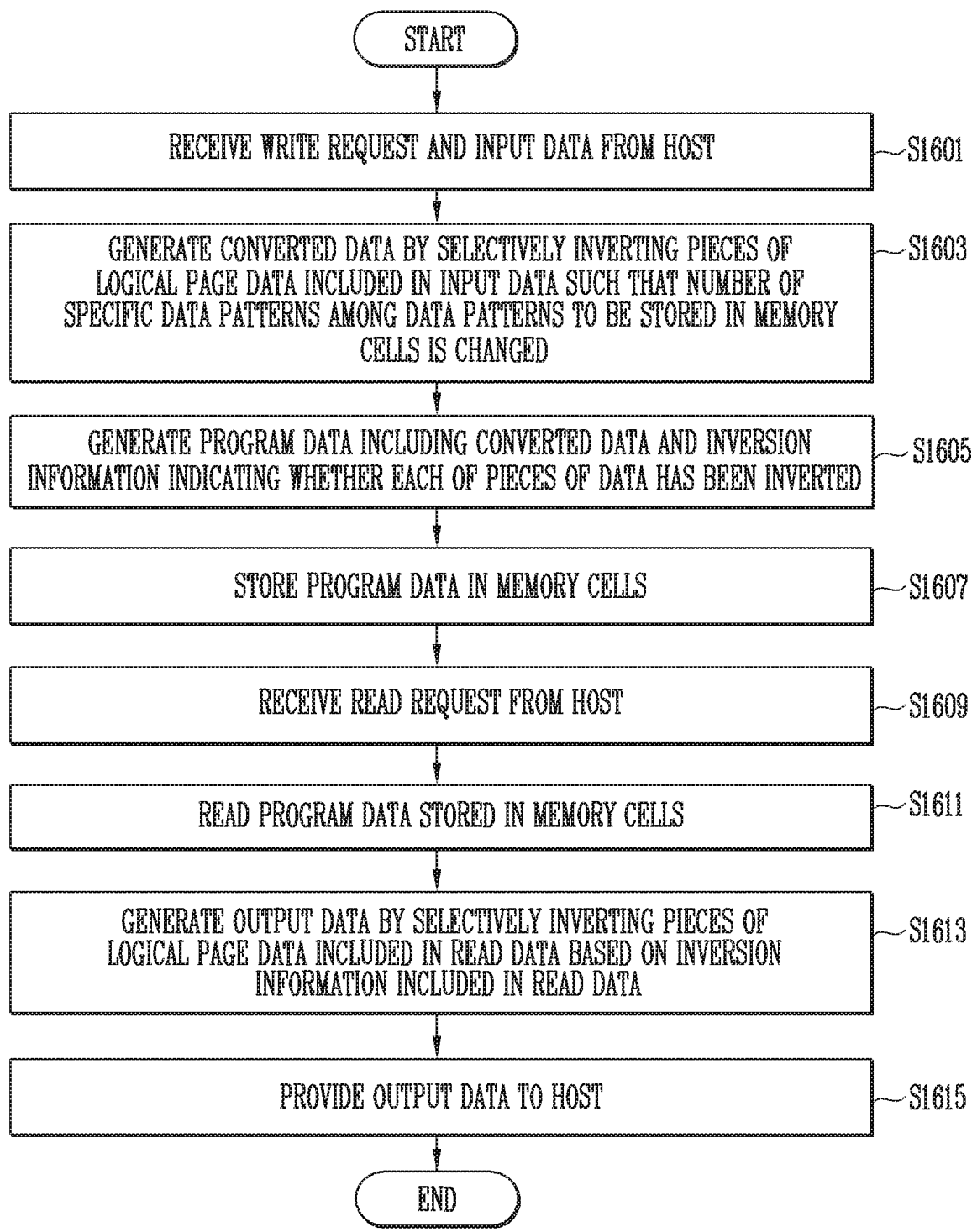
FIG. 16 is a flowchart illustrating an operation of the storage device in accordance with an embodiment of the present disclosure.

FIG. 16 is a flowchart illustrating an operation of the storage device in accordance with an embodiment of the present disclosure.

Referring to FIG. 16, at step S1601, the storage device may receive a write request and input data from the host.

At step S1603, the storage device may generate converted data by selectively inverting a plurality of pieces of logical page data included in the input data such that the number of specific data patterns among data patterns to be stored in memory cells is changed.

At step S1605, the storage device may generate program data including the converted data and inversion information indicating whether each of the plurality of pieces of logical page data has been inverted.

At step S1607, the storage device may store the program data in the memory cells.

At step S1609, the storage device may receive a read request from the host. The read request may be a request instructing to read the program data stored in the memory cells.

At step S1611, the storage device may read the program data stored in the memory cells.

At step S1613, the storage device may generate output data by selectively inverting a plurality of pieces of logical page data included in the read data based on the inversion information included in the read data.

At step S1615, the storage device may provide output data to the host.

Figure 17:
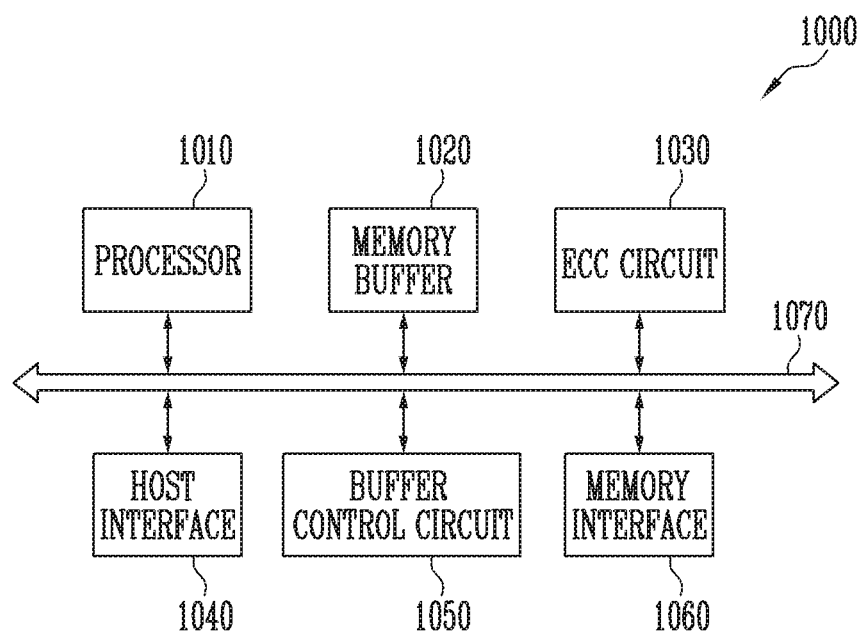
FIG. 17 is a diagram illustrating an embodiment of the memory controller of FIG. 1.

FIG. 17 is a diagram illustrating an embodiment of the memory controller of FIG. 1.

Referring to FIG. 17, a memory controller 1000 is coupled to a host and a memory device, e.g., to host 300 and memory device 100 of FIG. 1. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component thereof.

The host interface 1040 may communicate with the external host under control of the processor 1010. The host interface 1040 may perform communication using at least one of various communication methods, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other so as not to interfere with, nor affect, each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 18:
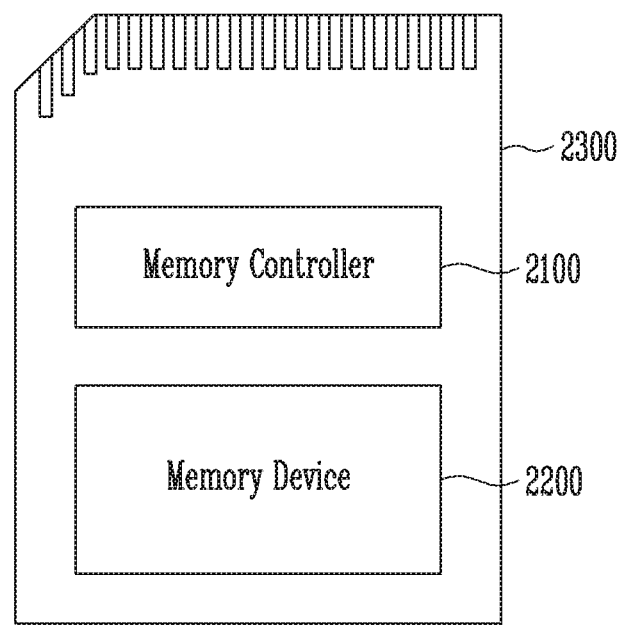
FIG. 18 is a block diagram illustrating a memory card system employing the storage device in accordance with an embodiment of the present disclosure.

FIG. 18 is a block diagram illustrating a memory card system 2000 to which the storage device is applied in accordance with an embodiment of the present disclosure.

Referring FIG. 18, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols, such as universal serial bus (USB), multimedia card (MMC), embedded MMC (eMMC), peripheral component interconnection (PCI), PCI-express (PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card, such as a personal computer memory card international association (PCM-CIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 19:
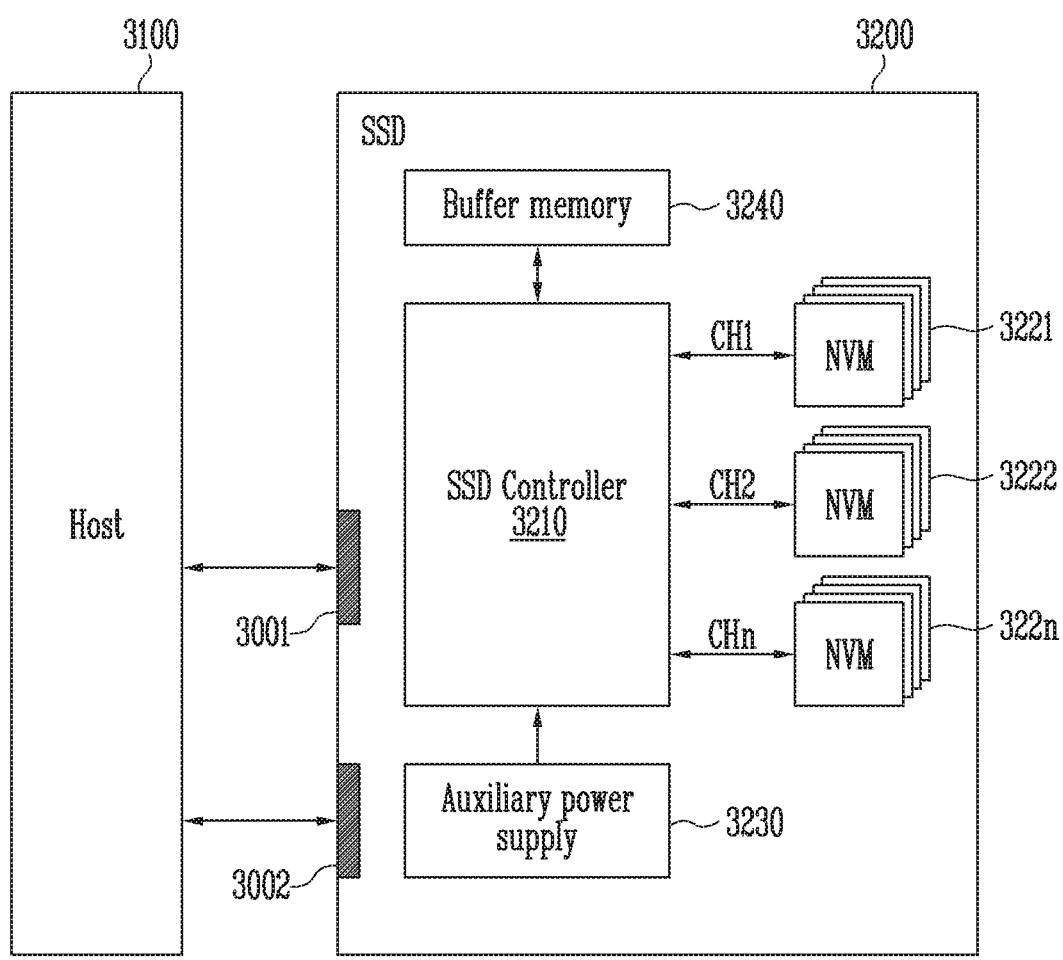
FIG. 19 is a block diagram illustrating a solid state drive (SSD) system employing the storage device in accordance with an embodiment of the present disclosure.

FIG. 19 is a block diagram illustrating a solid state drive (SSD) system 3000 employing the storage device in accordance with an embodiment of the present disclosure.

Referring to FIG. 19, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322$n$ in response to the signals SIG received from the host 3100. In an embodiment, the signals SIG may be based on an interface between the host 3100 and the SSD 3200. For example, the signals SIG may be defined by at least one of various interfaces, such as universal serial bus (USB), multimedia card (MMC), embedded MMC (eMMC), peripheral component interconnection (PCI), PCI-express (PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be disposed within the SSD 3200 or provided as a separate component external to the SSD 3200. For example, the auxiliary power supply 3230 may be disposed in a main board and may supply auxiliary power to the SSD 3200.

The buffer memory 3240 may serve the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may be implemented as any of various volatile memories such as a DRAM, an SDRAM, a DDR SDRAM, an LPDDR SDRAM, and a GRAM or as any of various nonvolatile memories such as an FRAM, a ReRAM, an STT-MRAM, and a PRAM.

FIG. 20 is a block diagram illustrating a user system 4000 to which the storage device is applied in accordance with an embodiment of the present disclosure.

Referring to FIG. 20, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may be implemented as a volatile RAM such as a DRAM, an SDRAM, a DDR SDRAM, a DDR2 SDRAM, a DDR3 SDRAM, an LPDDR SDRAM, and/or an LPDDR3 SDRAM, or implemented as a nonvolatile RAM such as a PRAM, a ReRAM, an MRAM, and/or an FRAM. In an embodiment, the application processor 4100 and the memory module 4200 may be packaged based on package-on-package (POP) as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (ReRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIG. 1. The storage module 4400 may be operated in the same manner as that of the storage device 50, described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a motor.

As described above, various embodiments of the present disclosure may provide a storage device having improved reliability, and a method of operating the storage device.

Although embodiments of the present disclosure have been disclosed, those skilled in the art will appreciate in light of the present disclosure that various modifications, additions and substitutions are possible, without departing from the scope and spirit of the present disclosure.

Therefore, the scope of the present invention is defined by the appended claims and equivalents thereof, rather than by the description preceding them.

In the above-discussed embodiments, in some cases one or more steps may be selectively performed or skipped. In addition, the steps may not be always performed in regular order. Furthermore, the embodiments disclosed herein aim to help those with ordinary knowledge in this art more clearly understand the present invention, rather than aiming to limit the bounds of the present invention. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

What is claimed is:

1. A memory controller configured to control a memory device including memory cells, the memory controller comprising:
   an input/output buffer configured to store input data provided from a host;
   a data converter configured to generate program data obtained by converting the input data such that a number of specific data patterns among data patterns to be stored in the memory cells is increased; and
   an operation controller configured to provide the program data to the memory device,
   wherein the program data is generated by selectively inverting a plurality of pieces of logical page data included in the input data, and
   wherein each of the specific data patterns is either a data pattern corresponding to a program state having a highest threshold voltage among programmed states of the memory cells or a data pattern corresponding to an erased state.

2. The memory controller according to claim 1, wherein the program data includes inversion information indicating whether the plurality of pieces of logical page data has been inverted.

3. The memory controller according to claim 2,
wherein the memory cells comprise main cells provided to store user data, and spare cells provided to store spare data, and
wherein the inversion information is stored in the spare cells.

4. The memory controller according to claim 1, wherein the data converter comprises:
a data pattern counter configured to generate inversion control information indicating whether to invert the plurality of pieces of logical page data such that the number of specific data patterns is changed;
a data inverter configured to generate the program data by selectively inverting the plurality of pieces of logical page data based on the inversion control information; and
an encoding data buffer configured to store the program data.

5. The memory controller according to claim 4, wherein the data pattern counter generates the inversion control information such that the number of specific data patterns is increased.

6. The memory controller according to claim 1, wherein each of the specific data patterns is a preset data pattern.

7. A memory controller configured to control a memory device including memory cells, the memory controller comprising:
an operation controller configured to receive, from the memory device, read data obtained by reading data stored in the memory cells, the read data including a plurality of pieces of logical page data and inversion information corresponding to the plurality of pieces of logical page data;
a data converter configured to generate output data obtained by selectively inverting the plurality of pieces of logical page data based on the inversion information; and
an input/output buffer configured to provide the output data to a host,
wherein the read data is inverted data such that a number of specific data patterns among data patterns in original data is increased, and
wherein each of the specific data patterns is either a data pattern corresponding to a program state having a highest threshold voltage among programmed states of the memory cells or a data pattern corresponding to an erased state.

8. The memory controller according to claim 7, wherein the inversion information indicates whether the plurality of pieces of logical page data has been inverted.

9. The memory controller according to claim 7,
wherein the memory cells comprise main cells provided to store user data, and spare cells provided to store spare data, and
wherein the inversion information is stored in the spare cells.

10. A method of operating a memory controller configured to control a memory device including memory cells, the method comprising:
generating program data obtained by converting input data provided from a host such that a number of specific data patterns among data patterns to be stored in the memory cells is increased; and
providing, to the memory device, a program command for storing the program data in the memory device,
wherein the program data is generated by selectively inverting a plurality of pieces of logical page data included in the input data, and
wherein each of the specific data patterns is either a data pattern corresponding to a program state having a highest threshold voltage among programmed states of the memory cells or a data pattern corresponding to an erased state.

11. The method according to claim 10, wherein the program data includes inversion information indicating whether the plurality of pieces of logical page data has been inverted.

12. The method according to claim 10, wherein the generating of the program data comprises selectively inverting the plurality of pieces of logical page data such that the number of specific data patterns is increased.

* * * * *